US009053533B2

(12) United States Patent
Hirota et al.

(10) Patent No.: US 9,053,533 B2
(45) Date of Patent: Jun. 9, 2015

(54) IMAGE PROCESSING APPARATUS, IMAGE PROCESSING METHOD, AND COMPUTER-READABLE RECORDING MEDIUM FOR EXTRACTING A DARK PORTION AREA FROM AN INTRALUMINAL IMAGE

(75) Inventors: Masashi Hirota, Hachioji (JP); Yamato Kanda, Hino (JP); Makoto Kitamura, Hachioji (JP); Takehiro Matsuda, Hachioji (JP); Takashi Kono, Tachikawa (JP)

(73) Assignee: OLYMPUS CORPORATION, Tokyo (JP)

( * ) Notice: Subject to any disclaimer, the term of this patent is extended or adjusted under 35 U.S.C. 154(b) by 626 days.

(21) Appl. No.: 13/177,045

(22) Filed: Jul. 6, 2011

(65) Prior Publication Data
US 2012/0008860 A1 Jan. 12, 2012

(30) Foreign Application Priority Data

Jul. 7, 2010 (JP) .................................. 2010-155208

(51) Int. Cl.
G06K 9/00 (2006.01)
G06K 9/62 (2006.01)
G06T 7/00 (2006.01)

(52) U.S. Cl.
CPC .............. *G06T 7/0012* (2013.01); *G06T 7/0081* (2013.01); *G06T 2207/10024* (2013.01); *G06T 2207/10068* (2013.01); *G06T 2207/20036* (2013.01); *G06T 2207/20224* (2013.01); *G06T 2207/30028* (2013.01)

(58) Field of Classification Search
CPC .................... G06T 2207/30028; G06K 9/0014
USPC .......................... 382/128, 164, 180, 173, 224
See application file for complete search history.

(56) References Cited

U.S. PATENT DOCUMENTS

| 2004/0116808 | A1* | 6/2004 | Fritz et al. ..................... 600/437 |
| 2008/0117210 | A1* | 5/2008 | Razeto et al. ................. 345/424 |
| 2008/0292154 | A1 | 11/2008 | Nishimura et al. |
| 2009/0041320 | A1* | 2/2009 | Tanaka .......................... 382/128 |
| 2009/0048482 | A1* | 2/2009 | Hong et al. .................... 600/103 |
| 2009/0074268 | A1* | 3/2009 | Tanaka et al. ................. 382/128 |

(Continued)

FOREIGN PATENT DOCUMENTS

| JP | 2000-30068 A | 1/2000 |
| JP | 2006-166939 | 6/2006 |
| JP | 2008301877 A | * 12/2008 |

(Continued)

OTHER PUBLICATIONS

English translation of JP 2008301877A.*

(Continued)

*Primary Examiner* — Yubin Hung
(74) *Attorney, Agent, or Firm* — Scully, Scott, Murphy & Presser, P.C.

(57) ABSTRACT

An image processing apparatus includes a low-luminance area detecting unit that detects a low-luminance area based on pixel values of pixels of the intraluminal image; a peripheral feature data calculating unit that calculates peripheral feature data based on pixel values of periphery of the low-luminance area; and a dark portion area determining unit that determines whether or not the low-luminance area is the dark portion area based on the peripheral feature data.

25 Claims, 25 Drawing Sheets

(56) References Cited

U.S. PATENT DOCUMENTS

| | | | |
|---|---|---|---|
| 2011/0044515 A1* | 2/2011 | Spyridonos et al. | 382/128 |
| 2011/0135171 A1* | 6/2011 | Galigekere et al. | 382/128 |

FOREIGN PATENT DOCUMENTS

| | | |
|---|---|---|
| JP | 2010-115260 A | 5/2010 |
| WO | 2006/062163 A1 | 6/2006 |
| WO | 2007/105516 A1 | 9/2007 |
| WO | 2007/105517 A1 | 9/2007 |
| WO | 2007/119296 A1 | 10/2007 |
| WO | 2007/138792 A1 | 12/2007 |
| WO | 2008/044466 A1 | 4/2008 |
| WO | 2008/149674 A1 | 12/2008 |
| WO | 2009/069394 A1 | 6/2009 |

OTHER PUBLICATIONS

Kumar et al. ("Real-time automatic extraction of lumen region and boundary from endoscopic images," Medical & Biological Engineering & Computing, vol. 37, 1999, pp. 600-604).*

Vandenberg et al. ("Fully automated media and lumen boundary detection in intravascular ultrasound images," Proceedings of the IEEE Southwest Symposium on Image Analysis and Interpretation, 1996).*

Zabulis, X. et al., "Lumen Detection for Capsule Endoscopy", Intelligent Robots and Systems, Sep. 22-26, 2008 International Conference on Intelligent Robots and Systems, Acropolis Convention Center, Nice, France, pp. 3921-3926.

Kwoh, C.K. et al., "Automated Endoscope Navigation and Advisory System from Medical Imaging", Proceedings of SPIE, San Diego, California, Feb. 1999, vol. 3660, pp. 214-224.

Tian, H. et al., "Automatic Segmentation Algorithm for the Extraction of Lumen Region and Boundary from Endoscopic Images", Medical & Biological Engineering & Computing, Jan. 1, 2001, vol. 39, No. 1, pp. 8-14.

European Search Report dated Nov. 29, 2011 from corresponding European Patent Application No. EP 11 00 5476.4.

Notice of Rejection dated May 20, 2014 from related Japanese Application No. 2010-155208, together with an English language translation.

* cited by examiner

IMAGE PROCESSING APPARATUS, IMAGE PROCESSING METHOD, AND COMPUTER-READABLE RECORDING MEDIUM FOR EXTRACTING A DARK PORTION AREA FROM AN INTRALUMINAL IMAGE

CROSS-REFERENCE TO RELATED APPLICATIONS

This application is based upon and claims the benefit of priority from Japanese Patent Application No. 2010-155208, filed on Jul. 7, 2010, the entire contents of which are incorporated herein by reference.

BACKGROUND OF THE INVENTION

1. Field of the Invention

The present invention relates to an image processing apparatus, an image processing method, and a computer-readable recording medium for extracting a dark portion area from an intraluminal image acquired by imaging the inside of a lumen.

2. Description of the Related Art

Conventionally, endoscopes are widely used as a medical observation device that is introduced into the inside of a body of an examinee, such as a patient to observe the inside of a lumen in the body. In addition, recently, an easting-type endoscope (capsule endoscope) is developed which has an imaging device, a communication device that transmits image data imaged by the imaging device outside the body in a wireless manner, and the like within a capsule-type casing. Since observation and diagnosis using an image of the inside of the lumen (intraluminal image) that is imaged by such a medical observation device requires an abundance of experience, a medical diagnosis supporting function that supports the diagnosis of a doctor is demanded. As one of image recognition technologies realizing such a function, there is suggested a technology for displaying an image to be focused for diagnosis by automatically detecting an abnormal portion, such as an affected area, from the intraluminal image.

However, the intraluminal image includes an area unnecessary for observation and diagnosis, such as an area (a dark portion area), on which a place that light barely reaches is reflected, for example, represented by the inside of a lumen. Accordingly, in order to detect the above-described abnormal portion, a great importance is put on a preprocessing technology for specifying an area to be focused such as a mucous membrane by performing a process of extracting such an area that is unnecessary for observation and diagnosis. For example, Japanese Laid-open Patent Publication No. 2006-166939 discloses a technology for detecting the presence of a specific body mucous membrane such as an affected mucous membrane within an image without being influenced by an unnecessary area such as a dark portion. According to Japanese Laid-open Patent Publication No. 2006-166939, pixels corresponding to unnecessary areas are excluded based on color information of each pixel, and then the presence of a specific body mucous membrane is detected.

SUMMARY OF THE INVENTION

An image processing apparatus for extracting a dark portion area from an intraluminal image according to the present invention includes a low-luminance area detecting unit that detects a low-luminance area based on pixel values of pixels of the intraluminal image; a peripheral feature data calculating unit that calculates peripheral feature data based on pixel values of periphery of the low-luminance area; and a dark portion area determining unit that determines whether or not the low-luminance area is the dark portion area based on the peripheral feature data.

A method of processing an image for extracting a dark portion area from an intraluminal image according to the present invention includes detecting a low-luminance area based on pixel values of pixels of the intraluminal image; calculating peripheral feature data based on the pixel values of the periphery of the low-luminance area; and determining whether or not the low-luminance area is the dark portion area based on the peripheral feature data.

A non-transitory computer-readable recording medium according to the present invention has an executable program stored thereon for extracting a dark portion area from an intraluminal image. The program instructs a processor to perform: detecting a low-luminance area based on pixel values of pixels of the intraluminal image; calculating peripheral feature data based on the pixel values of the periphery of the low-luminance area; and determining whether or not the low-luminance area is the dark portion area based on the peripheral feature data.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
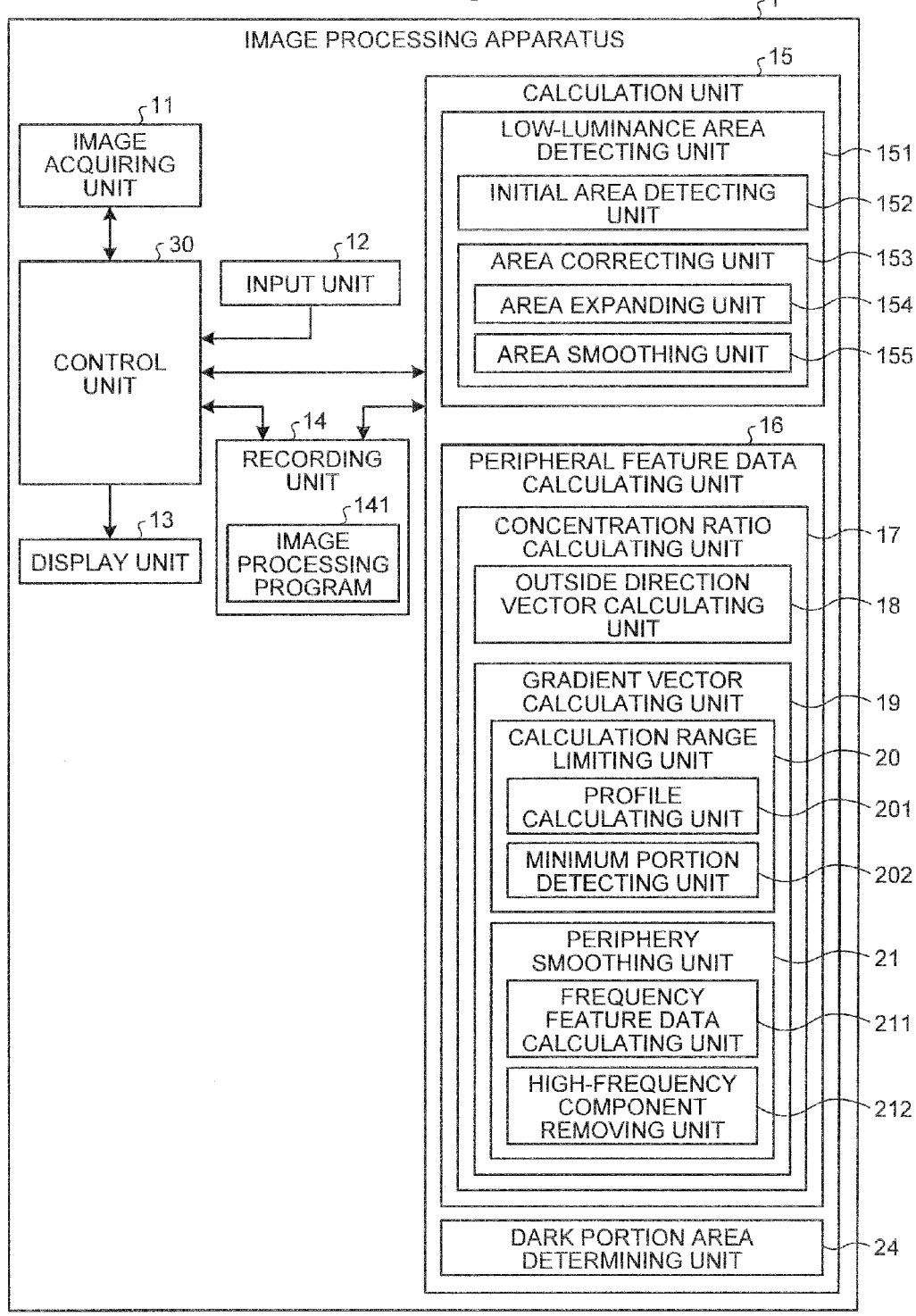
FIG. 1 is a block diagram illustrating a functional configuration of an image processing apparatus according to a first embodiment.

Hereinafter, preferred embodiments of the present invention will be described with reference to the accompanying drawings. However, the present invention is not limited thereto. Like reference numerals in the drawings denote like elements.

Here, an image processing apparatus according to an embodiment, for example, is a device for processing an image (an intraluminal image) that is acquired by imaging the inside of a lumen such as a gastrointestinal tract inside the body of an examinee by using a medical observation device such as an endoscope and a capsule endoscope. Specifically, the image processing apparatus extracts a dark-portion area from the intraluminal image as a preprocess when a process is performed which specifies an area to be focused such as a mucous membrane and extracts an abnormal area such as a diseased area and a bleeding area. As described above, the intraluminal image is an image acquired by imaging the inside of a lumen such as a gastrointestinal track using the medical observation device. Since the inside of the lumen is distant from the medical observation device and thus is difficult to be exposed to light, the portion is represented as a dark area. Here, the dark-portion area refers to a dark area in which the inside of the lumen is reflected. This dark-potion area is an area unnecessary for observation and diagnosis rather than an area to be focused. In addition, in this embodiment, the intraluminal image imaged by the medical observation device is, for example, a color image with pixel levels (pixel values) corresponding to the color components red (R), green (G), and blue (B).

First Embodiment

First, a configuration of an image processing apparatus according to a first embodiment will be described. FIG. 1 is a block diagram illustrating a functional configuration of an image processing apparatus 1 according to the first embodiment. The image processing apparatus 1 according to the first embodiment, as illustrated in FIG. 1, includes an image acquiring unit 11, an input unit 12, a display unit 13, a recording unit 14, a calculation unit 15, and a control unit 30 that controls the overall operation of the image processing apparatus 1.

The image acquiring unit 11 acquires image data of an intraluminal image imaged by a medical observation device. The image data acquired by the image acquiring unit 11 is recorded in the recording unit 14, processed by the calculation unit 15, and then displayed on the display unit 13 as is necessary. The image acquiring unit 11 includes a reader device to which a recording medium is detachably attached and which reads out the image data of the intraluminal image which is stored therein when a portable recording medium is used for communication of image data with the medical observation device such as when the medical observation device is a capsule endoscope or the like. Alternatively, the image acquiring unit 11 may include a communication device or the like to connect with a server when the image data is acquired from the server which stores the image data of an intraluminal image imaged by the medical observation device and is placed at an appropriate site. Then, the image processing apparatus 1 acquires the image data of the intraluminal image by performing data communication with the server through the image acquiring unit 11. In addition, further alternatively, the image acquiring unit 11 may include an interface device or the like that receives an image signal output from the medical observation device such as an endoscope as input through a cable.

The input unit 12 is realized, for example, by a keyboard, a mouse, a touch panel, or various switches and outputs an input signal to the control unit 30. The display unit 13 is realized by a display device such as an LCD or an EL display and displays various screens containing the intraluminal image under the control of the control unit 30.

The recording unit 14 is realized by various IC memories represented by ROMs and RAMs such as rewritable flash memories, a hard disk that is built in or is connected to a data communication terminal, an information recording medium such as a CD-ROM, a reading device thereof, and the like. In the recording unit 14, a program for realizing various functions included in the image processing apparatus 1 by operating the image processing apparatus 1, and data used for execution of the program, and the like are recorded. For example, the image data of the intraluminal image that is acquired by the image acquiring unit 11 is recorded in the recording unit 14. In addition, the recording unit 14 stores an image processing program 141 for extracting a dark-portion area from the intraluminal image on the basis of the concentration ratio of the gradient which is an example of a peripheral feature data.

The calculation unit 15 is realized by hardware such as a CPU. The calculation unit 15 performs various calculation processes for extracting a dark-portion area by processing the intraluminal image. This calculation unit 15 includes a low-luminance area detecting unit 151 corresponding to a low-luminance area detecting means, a peripheral feature data calculating unit 16 corresponding to a peripheral feature data calculating means, and a dark portion area determining unit 24 corresponding to a dark-portion area determining means.

The low-luminance area detecting unit 151 detects a low-luminance area from the intraluminal image based on the pixel values of pixels of the intraluminal image. The low-luminance area detecting unit 151 includes an initial area detecting unit 152 as a unit used for detecting an initial area and an area correcting unit 153 as a unit used for correcting an area. The initial area detecting unit 152 detects the initial area based on a color feature data of the intraluminal image that is based on color information of the pixels. The area correcting unit 153 is a functional unit that corrects the initial area based on the color feature data of the periphery (described in detail, the outer periphery) of the initial area and includes an area expanding unit 154 as a unit used for expanding an area and an area smoothing unit 155 as a unit used for smoothing the contour. The area expanding unit 154 expands the initial area by integrating an adjacent area, of which the color feature data is similar to that of the initial area, out of adjacent areas adjacent to the initial area with the initial area. The area smoothing unit 155 corrects the contour of the low-luminance area, which is generated by expanding the initial area by using the area expanding unit 154, to be smooth.

The peripheral feature data calculating unit 16 is a functional unit that calculates peripheral feature data of a low-luminance area based on pixel values of the periphery of the low-luminance area and includes a concentration ratio calculating unit 17 as a unit used for calculating the concentration ratio of the gradient as an example of the peripheral feature data and a unit used for calculating an inner product. The concentration ratio of the gradient is a value that represents the degree of the direction of the gradient (gradient vector) on the periphery of the low-luminance area being fitted to the side of the low-luminance area. The concentration ratio calculating unit 17 includes an outside direction vector calculating unit 18 as a unit used for calculating an outside direction vector and a unit used for calculating a normal-line vector and a gradient vector calculating unit 19 as a unit used for calculating a gradient vector.

The outside direction vector calculating unit 18 calculates a vector starting from the low-luminance area toward an outside direction (the outer side of the low-luminance area) (an outer direction vector; the outside direction vector is set as a unit vector).

On the other hand, the gradient vector calculating unit 19 calculates a gradient vector (here, a gradient vector is a unit vector) in an area located on the outside of the low-luminance area, that is, on the periphery of the low-luminance area based on the outside direction vector. This gradient vector calculating unit 19 includes a calculation range limiting unit 20 as a unit used for limiting the calculation range and a periphery smoothing unit 21 as a unit used for smoothing the periphery. The calculation range limiting unit 20 is a functional unit that limits the calculation range of a gradient vector based on whether or not a steep gradient is present on the periphery of the low-luminance area and includes a profile calculating unit 201 as a unit used for calculating a profile and a minimum portion detecting unit 202 as a unit used for detecting a minimum portion. The profile calculating unit 201 acquires pixel values on an extension contour line that is set parallel with the contour of the low-luminance area on the periphery of the low-luminance area and calculates a periphery profile that represents a change in the pixel value along the extension contour line. The minimum portion detecting unit 202 detects a minimum portion in which the change in the pixel value, which is represented by the periphery profile, is a minimum. The periphery smoothing unit 21 is a functional unit smoothing the periphery of the low-luminance area based on frequency components thereof and includes a frequency feature data calculating unit 211 as a unit used for calculating frequency feature data and a high-frequency component removing unit 212 as a unit used for removing a high-frequency component. The frequency feature data calculating unit 211 calculates a maximum frequency on the periphery of the low-luminance area as frequency feature data. The high-frequency component removing unit 212 removes a high-frequency component from the periphery of the low-luminance area based on the frequency feature data.

The concentration ratio calculating unit 17 acquires the inner product of the outside direction vector that is calculated by the outside direction vector calculating unit 18 and the gradient vector that is calculated by the gradient vector calculating unit 19 and calculates the concentration ratio of the gradient based on the inner product.

The dark portion area determining unit 24 determines whether or not a low-luminance area is a dark portion area based on the concentration ratio of the gradient that is calculated as the peripheral feature data of the low luminance area by the peripheral feature data calculating unit 16.

The control unit 30 is realized by hardware such as a CPU. This control unit 30 transmits an instruction, data, or the like to each unit of the image processing apparatus 1 based on the image data acquired by the image acquiring unit 11, an input signal input from the input unit 12, a program or data recorded in the recording unit 14, and the like, thereby controlling the overall operation of the image processing apparatus 1.

Figure 2:
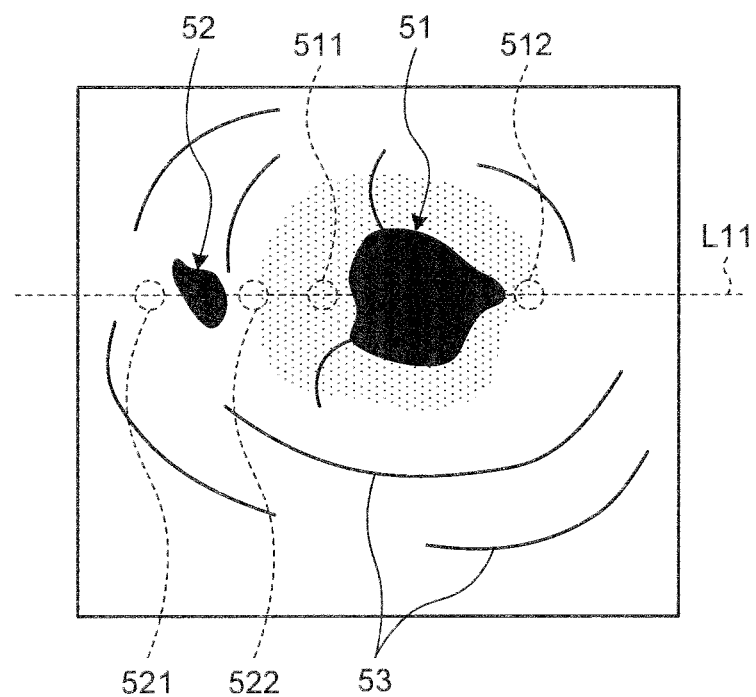
FIG. 2 is a schematic diagram of an intraluminal image.
Figure 3:
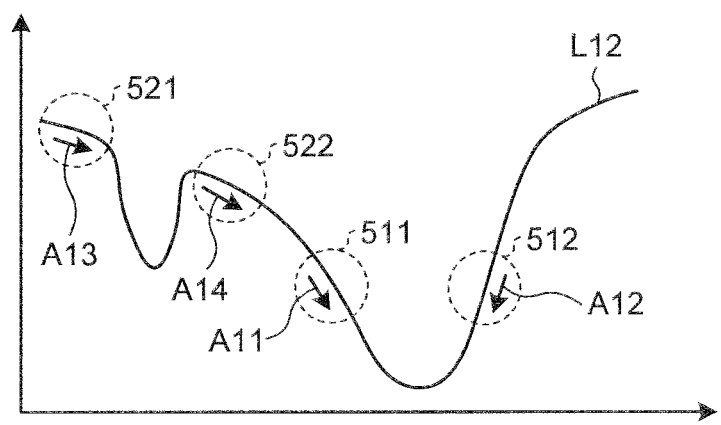
FIG. 3 is a diagram illustrating a variation in pixel value within the intraluminal image.

First, the principle of detecting a dark portion area according to the first embodiment will be described. FIG. 2 is a schematic diagram of an intraluminal image. FIG. 3 is a diagram illustrating a change in the pixel value within the intraluminal image and illustrates a change curve L12 of the pixel value on a line L11 denoted by a broken line n FIG. 2. In the intraluminal image that is imaged in a state in which a medical observation device is placed toward the inside of a lumen, as illustrated in FIG. 2, the inside of the lumen is reflected as a dark portion area 51. This dark portion area 51 is shown as a black area in the intraluminal image. For example, in the intraluminal image illustrated in FIG. 2, the dark portion area 51 and a black area 52 other than the dark portion area 51 are illustrated. In addition, in the intraluminal image, grooves 53 that are generated, for example, by folding or undulations of a mucosal architecture of the inner wall of a digestive tract are reflected.

As described above, although the dark portion area is a black area of the intraluminal image, an area other than the dark portion area such as an area of coagulated blood or the like is represented also as a black area that is similar to the dark portion area in the intraluminal image. The area of the coagulated blood or the like, differently from the dark portion area, is an area to be focused when being observed and diagnosed. For example, it is assumed that the black area 52 other than the dark portion area 51 is an area of the coagulated blood or the like in FIG. 2.

Here, since being an area located at a position far from the capturing face inside the lumen, the dark portion area has such a feature that a change in the pixel value on the periphery thereof is inclined toward the side of the dark portion area. For example, as illustrated in the change curve L12 of pixel values illustrated in FIG. 3, in areas 511 and 512 located on the periphery of the dark portion area 51 shown in FIG. 2, as denoted by arrows A11 and A12 shown in FIG. 3, the pixel value decreases toward the side of the dark portion area 51, and, the change in the pixel value is inclined toward the dark portion area 51 in the entire area of the periphery of the dark portion area 51. In contrast to this, in the case of the black area 52 that is the area of the coagulated blood or the like, while the pixel value decreases toward the side of the black area 52, for example, in the left-side area 521, which faces the center in FIG. 2, located on the periphery of the black area 52 as denoted by an arrow A13 in FIG. 3, in the right-side area 522, as denoted by an arrow A14, the pixel value decreases in a direction opposite to the black area 52. In other words, in the right-side area 522 of the black area 52, the pixel value decreases toward the dark portion area 51 that is located to the right side of the black area 52. Thus, in the first embodiment, first, a low-luminance area that is a candidate for a dark portion area is detected from the intraluminal image. Then, whether or not the detected low-luminance area is a dark portion area is determined by focusing the direction in which the change in the pixel value on the periphery of the detected low-luminance area, and more particularly, the direction in which the change in the pixel value is inclined is focused, and the dark portion area is extracted.

Figure 4:
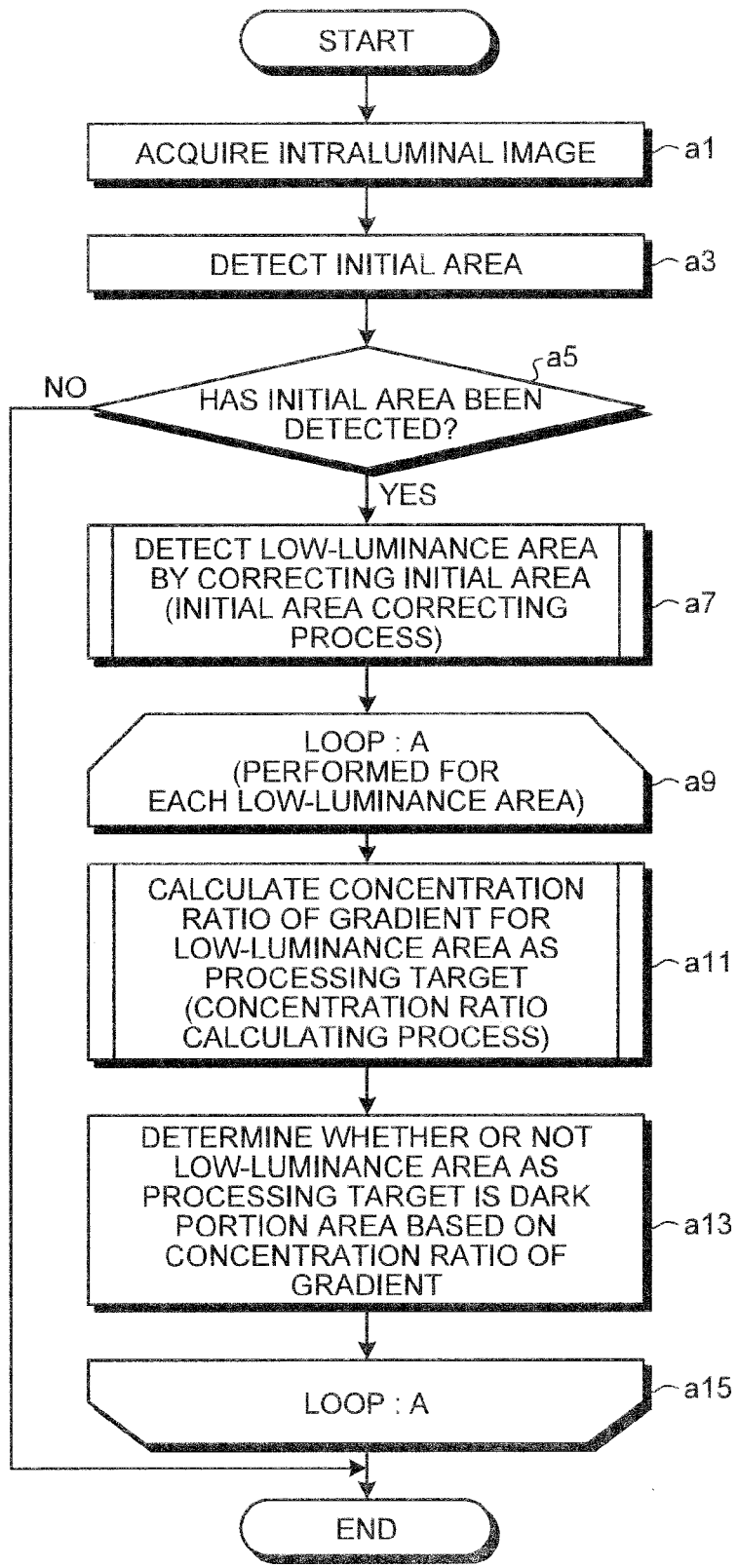
FIG. 4 is an overall flowchart illustrating a processing sequence performed by an image processing apparatus 1 according to the first embodiment.

Next, a detailed processing sequence performed by the image processing apparatus 1 according to the first embodiment will be described. FIG. 4 is an entire flowchart illustrating the processing sequence performed by the image processing apparatus 1 according to the first embodiment. The process described here is realized by performing an image processing program 141 recorded in the recording unit 14 by using the calculation unit 15.

As illustrated in FIG. 4, first, the calculation unit 15 acquires an intraluminal image as a processing target in Step a1. Through the process performed here, the calculation unit 15 acquires the intraluminal image by reading out the intraluminal image, which is acquired by the image acquiring unit 11 and is recorded in the recording unit 14, as the processing target.

Subsequently, the initial area detecting unit 152 of the low-luminance area detecting unit 151 detects an initial area based on color feature data of the intraluminal image (Step a3). As a detailed processing sequence, first, the edge strength of the intraluminal image is calculated. The edge strength is calculated for each pixel by using a known edge extraction technique such as a first-order differential process using a Sobel filter or the like or a second-order differential process using Laplacian or the like. Here, hemoglobin that is a constituent element of a blood vessel or a bleeding site that is reflected into the intraluminal image has a property of absorbing a large amount of light of a short-wavelength band. Since the hemoglobin has the property of absorbing light of a short-wavelength band, the luminance value of a green (G) component or a blue (B) component, in which most of the wavelength component is in a short-wavelength band, decreases due to light absorption of the hemoglobin. On the other hand, since the value (R value) of an R component in which the most of the wavelength component is in a long wavelength band is absorbed less, and most of the light is reflected, information on which the surface structure of a body tissue is reflected the most can be acquired from the R value. Accordingly, in order to acquire the contour of a body tissue that is formed by the surface structure of the body tissue, an image of the R component (an image acquired by setting the pixel value of each pixel to an R value) may be generated to calculate the edge strength of each pixel based on the R-component image.

Thereafter, the area of the intraluminal image is divided based on the edge strength of each pixel. A technique used for the dividing of the area of the intraluminal image is not particularly limited, and a known technique is appropriately used. For example, a technique may be used which is disclosed in International Publication Pamphlet No. WO 2006/080239. The procedure will be briefly described. First, smoothing is performed for an edge-strength image for the purpose of noise removal as is necessary. Thereafter, the gradient direction of pixel values for each pixel of the edge-strength image for which the smoothing has been performed is acquired. At this time, the gradient direction is a direction in which a difference in the pixel value between the pixel and adjacent pixels is a minimum (a negative value is a maximum). Next, an extreme pixel that is reached by each pixel along the gradient direction of pixel values is acquired, and the image is divided such that adjacent pixels that have reached the extreme pixel are in the same area. As another technique used for the dividing of the area, a known watershed algorithm may be used. The watershed algorithm is a technique in which an image is divided such that, in a case a terrain, in which pixel value information of an image is regarded as elevation, is filled with water, a boundary from water held in another concave is formed. Accordingly, by performing appropriate smoothing for the edge-strength image and then performing the watershed algorithm for the edge-strength image, the area can be divided based on the edge strength.

Thereafter, average luminance as an example of the color feature data is calculated for each divided area (division area). Described in more detail, a luminance value is calculated for each pixel within the division area based on the color information (an R value, a G value, and a B value), and an average value of calculated luminance values of pixels within the division area is calculated as average luminance. Then, an area of which the average luminance is a predetermined threshold value or less is extracted from the division area and is labeled. As a detailed content of the labeling process, a known technique may be applied. At this time, in a case where there are areas adjacent to each other out of the extracted areas, the adjacent areas are finally integrated as one area. Then, each area that has been extracted and appropriately integrated as above is detected as an initial area.

As a result of the process of Step a3 performed as described above, in a case where an initial area is not detected (No in Step a5), this process ends. A case where an initial area is not detected represents a case where there is no area of which the average luminance is the predetermined threshold value or less, and accordingly, it can be determined that an area as a candidate for a dark portion area is not included in the intraluminal image acquired in Step a1. On the other hand, in case where an initial area is detected (Yes in Step a5), subsequently, the area correcting unit 153 performs an initial area correcting process, and, by correcting the initial area detected in Step a3, a low-luminance area is detected in Step a7. FIG.

5 is a flowchart illustrating a detailed processing sequence of the initial area correcting process according to the first embodiment.

Figure 5:
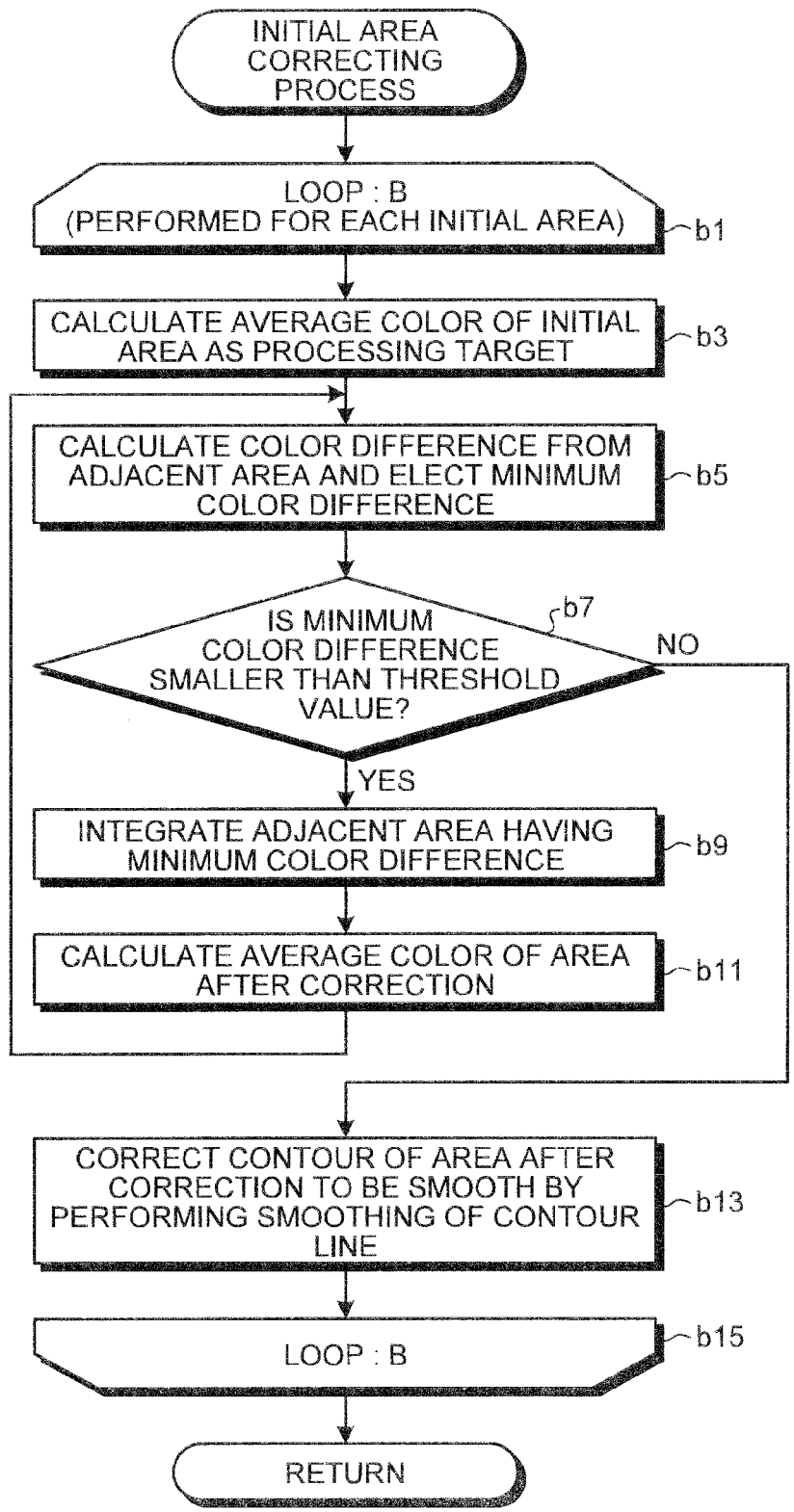
FIG. 5 is a flowchart illustrating a detailed processing sequence of an initial area correcting process according to the first embodiment.

In the initial area correcting process, as illustrated in FIG. 5, the process of loop B is performed for each initial area in Steps b1 to b15. Described in more detail, in loop B, first, the area expanding unit 154 of the area correcting unit 153 calculates an average color of the initial area as a processing target in Step b3. Here, for example, a value L*a*b* is calculated based on the R, G, and B values of each pixel within the initial area. Then, an average L*a*b* value (L*$_s$, a*$_s$, b*s) that is an average value of the values L*a*b* calculated for the pixels is calculated so as to be set as the average color of the initial area as a processing target.

Thereafter, the area expanding unit 154 calculates a color difference between the initial area as a processing target and an adjacent area so as to elect a minimum color difference in Step b5, and repeatedly performs the process of Steps b9 to b5 while the calculated minimum color difference from the adjacent area is less than a predetermined threshold value (Yes in Step b7).

Described in more detail, in the process of Step b5 that is performed for the initial area as a processing target for the first time, division areas that are adjacent to the initial area as a processing target are specified based on the result of the division of the area that is performed when the initial area is detected in Step a3 shown in FIG. 4. Thereafter, a color difference ΔE between each specified adjacent area and the initial area as a processing target is calculated by using the following Equation (1).

Here, L*$_i$, a*$_i$, and b*$_i$ are L*a*b* average values of the adjacent area, that is, average L*a*b* values calculated based on the R, G, and B values of pixels located within the adjacent area. In addition, a minimum value of the color differences between the initial area and the adjacent areas that are calculated by using the following Equation (1) is elected as a minimum color difference.

$$\Delta E = \sqrt{(L^*_s - L^*_i)^2 + (a^*_s - a^*_i)^2 + (b^*_s - b^*_i)^2} \quad (1)$$

Subsequently, the area expanding unit 154 performs threshold processing for the minimum color difference calculated in Step b5. Then, for example, in a case where the minimum color difference is less than a threshold value set in advance (Yes in Step b7), the area expanding unit 154 integrates the adjacent area having the minimum color difference as the color difference ΔE with the initial area as a processing target and corrects the initial area as a processing target in Step b9. Thereafter, the area expanding unit 154 calculates the average color (average L*a*b* value) of the area after correction in the same sequence as that of Step b3 in Step b11.

After the average color of the area after correction is calculated as above, in the process of Step b5 that is performed for the second time and after that, the area expanding unit 154 calculates color differences between the area after correction and the adjacent areas so as to elect a minimum color difference. In other words, based on the result of the division of the area performed at the time of detecting the initial area in Step a3 shown in FIG. 4, division areas that are adjacent to the area after correction, in which the areas are integrated and corrected in Step b9, are specified as adjacent areas. Thereafter, a color difference ΔE between each specified adjacent area and the area after correction is calculated so as to elect a minimum color difference. At this time, the average L*a*b* values of the area after correction that are calculated in Step b11 are set as L*$_s$, a*$_s$, and b*$_s$, the L*a*b average values of the adjacent area are set as L*$_i$, a*$_i$, and b*$_i$, and the color difference ΔE is calculated by using the above-described Equation (1). In a case where the minimum color difference calculated in Step b5 is less than a predetermined threshold value (Yes in Step b7), the area expanding unit 154 further integrates the adjacent area of which the minimum color difference is the color difference ΔE in Step b9, and thereafter the same process is repeated.

On the other hand, in a case where the minimum color difference between the area after correction and the adjacent area is determined to be the predetermined threshold value or more in Step b7 (No in Step b7), the process proceeds to Step b13. Then, in Step b13, the area smoothing unit 155 performs smoothing of the contour line of the area after correction so as to correct the contour thereof to be smooth. As a detailed processing sequence, first, contour pixels of the area after correction are extracted. Thereafter, while the extracted contour pixels are sequentially set as a processing target, a process of replacing the coordinates of each contour pixel with average coordinates of the contour pixel and adjacent contour pixels is performed. For example, average coordinates of the contour pixel as a processing target and two next adjacent contour pixels on both sides are calculated. Then, the coordinates of the contour pixel as a processing target are replaced with the calculated average coordinates.

When the initial area is corrected, and the contour is corrected as above, the process of loop B for the initial area as the processing target is completed by setting the acquired area as a low-luminance area. Then, when the process of loop B has been performed for all the initial areas, the initial area correcting process ends, and the process is returned to Step a7 shown in FIG. 4.

Here, the method of detecting a low-luminance area based on the initial area is not limited to the initial area correcting process illustrated in FIG. 5. For example, a low-luminance area may be detected by using a known active contour method. The active contour method is a method in which an edge (contour) within an image is extracted as a closed curve. According to the active contour method, while the shape of the initial closed curve is transformed, a closed curve that is continuous and smooth and has a most stable total energy level that is based on the edge strength on the closed curve is extracted. By using the active contour method, a low-luminance area may be detected by setting the contour line of the initial area as an initial closed curve and transforming the shape thereof.

When the initial area correcting process ends as described above, as illustrated in FIG. 4, subsequently, the process of loop A is performed for each low-luminance area in Steps a9 to a15. In this loop A, first, the concentration ratio calculating unit 17 calculates the concentration ratio of the gradient of the low-luminance area as a processing target by performing a concentration ratio calculating process in Step a11. As described above, the periphery of the dark portion area has a feature that the change in the pixel value is inclined toward the dark portion area in the entire area thereof. Accordingly, in a case where the low-luminance area as a processing target is a dark portion area, the direction of the gradient vector on the outside of the contour is acquired as a direction opposite to the direction of the outside direction vector of the low-luminance area on the whole. Here, the concentration ratio of the gradient is calculated by calculating an outside direction vector and a gradient vector for each contour pixel and calculating an inner product thereof.

Figure 6:
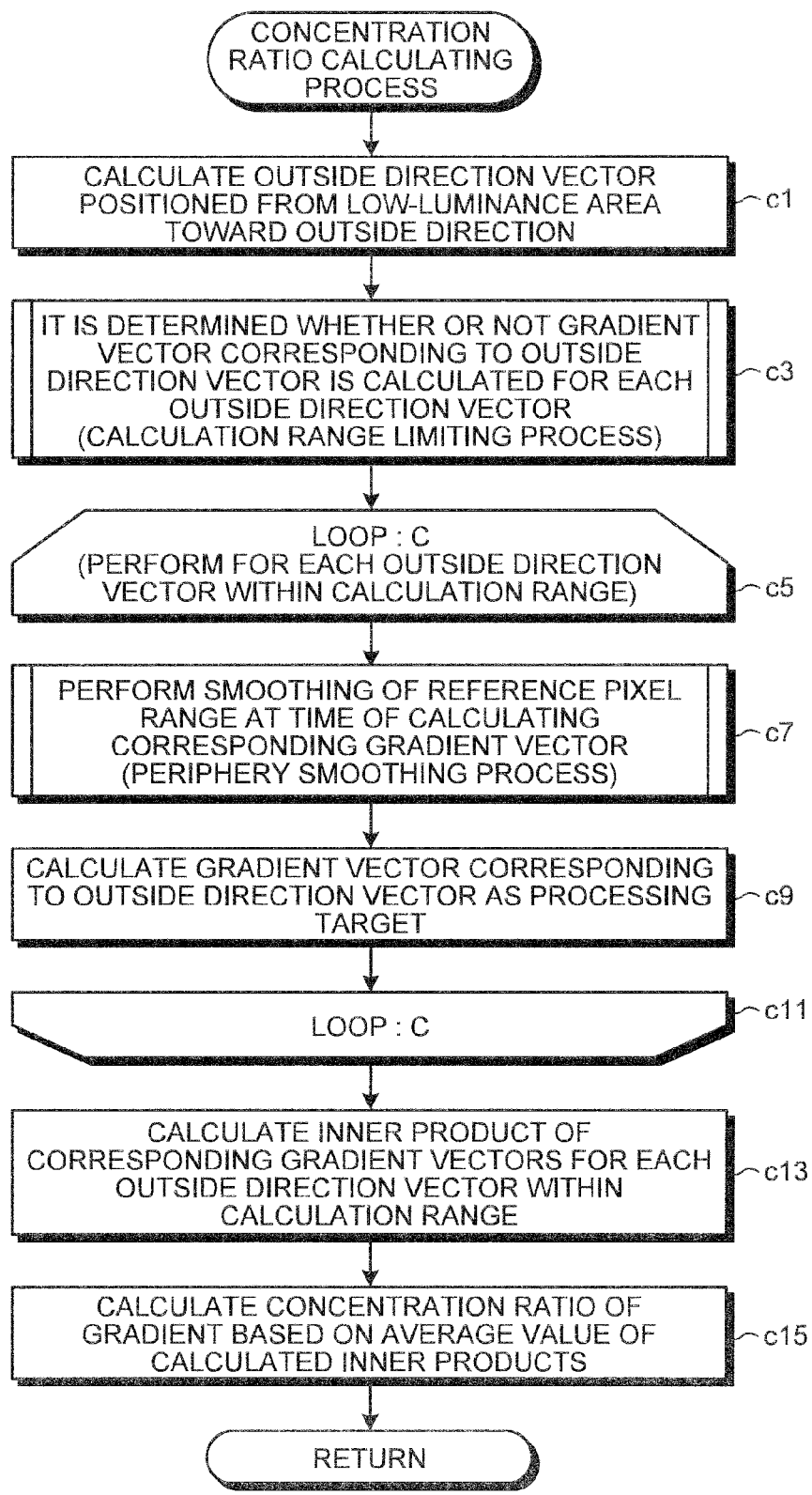
FIG. 6 is a flowchart illustrating a detailed processing sequence of a concentration ratio calculating process according to the first embodiment.
Figure 7:
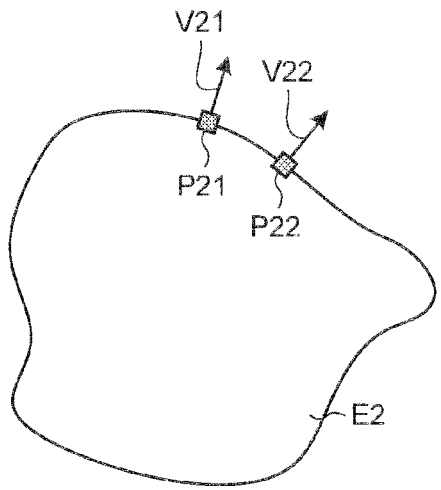
FIG. 7 is a diagram illustrating an outside direction vector according to the first embodiment.

FIG. 6 is a flowchart illustrating a detailed processing sequence of the concentration ratio calculating process according to the first embodiment. In the concentration ratio calculating process, as illustrated in FIG. 6, first, the outside direction vector calculating unit 18 calculates an outside direction vector starting from the low-luminance area toward the outside direction in Step c1. Here, for example, a vector (normal-line vector) in the direction of the normal line of the low-luminance area is calculated as the outside direction vector. FIG. 7 is a diagram illustrating an outside direction vector according to the first embodiment and illustrates normal-line vectors V21 and V22 that use two pixels P21 and P22 on the contour line of the low-luminance area E2 as base points (start points). As a detailed processing sequence, pixels (contour pixels) that constitute the contour of the low-luminous area are extracted, and a normal-line vector with respect to the contour of the low-luminance area is calculated for each contour pixel.

Subsequently, the calculation range limiting unit 20 of the gradient vector calculating unit 19 performs a calculation range limiting process and determines whether a gradient vector corresponding to each outside direction vector calculated in Step c1 is to be calculated in Step c3. As described above, a groove formed by the mucous membrane structure of the inner wall of the gastrointestinal track is reflected on the intraluminal image, and such a groove may be present on the periphery of the dark portion area. Here, at a site at which a groove is present on the periphery of the dark portion area, a gradient vector is not placed toward the side of the dark portion area but placed toward the side of the groove. Accordingly, in a case where the concentration ratio of the gradient is calculated by including the gradient vector positioned at a site at which a groove is present, the calculation accuracy decreases. Thus, in the calculation range limiting process of Step c3, the range used for calculating the gradient vector is limited depending on whether a groove is present on the outer side of the low-luminance area as a processing target. Described in more detail, a site on the periphery of the low-luminance area at which the gradient is steep is detected as a groove position. In a case where a groove is present at the end of the outside direction vector, a corresponding gradient vector is not calculated.

Figure 8:
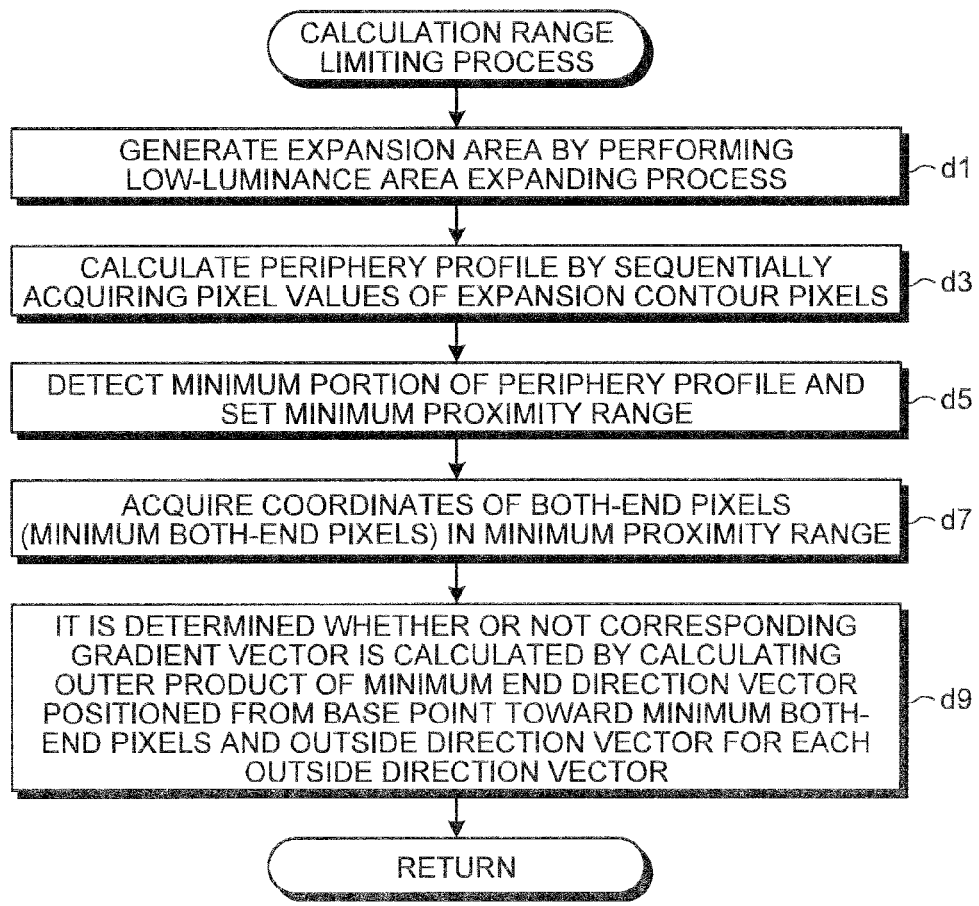
FIG. 8 is a flowchart illustrating a detailed processing sequence of a calculation range limiting process according to the first embodiment.
Figure 9:
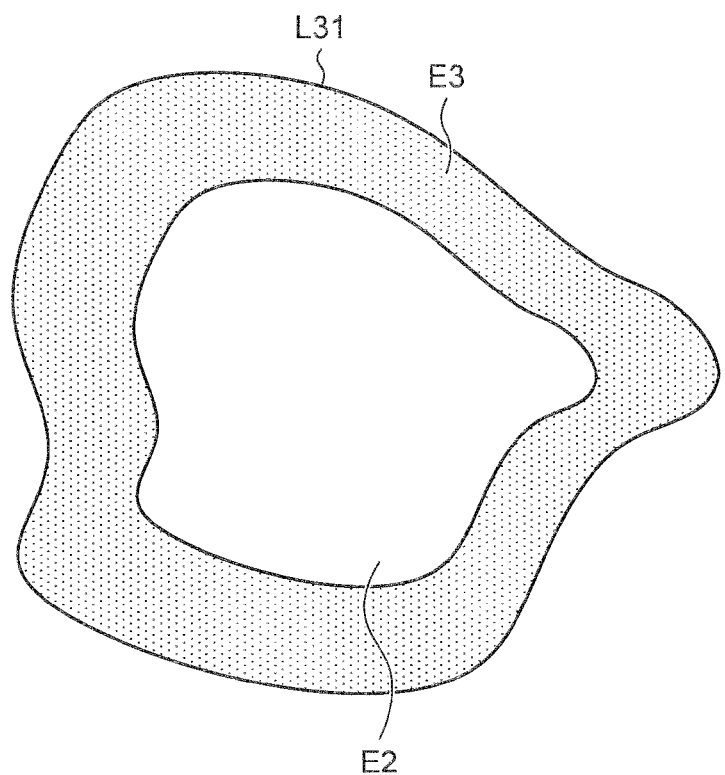
FIG. 9 is a diagram illustrating a state where a low-luminance area is expanded through an expansion process.

FIG. 8 is a flowchart illustrating a detailed processing sequence of a calculation range limiting process according to the first embodiment. In the calculation range limiting process, as illustrated in FIG. 8, first, the calculation range limiting unit 20 performs an expansion process for the low-luminance area, thereby expanding the low-luminance area so as to generate an expansion area on the outer periphery in Step d1. FIG. 9 is a diagram illustrating the appearance of expanding a low-luminance area E2 through an expansion process. The expansion of the low-luminance area E2 can be realized by applying a known expansion process. In Step d1 shown in FIG. 8, as illustrated in FIG. 9, an expansion area E3 is generated from the low-luminance area E2.

Figure 10:
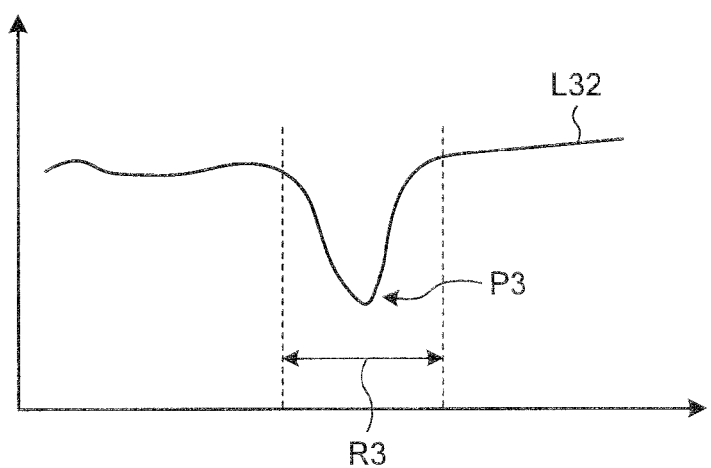
FIG. 10 is a diagram illustrating a periphery profile of a low-luminance area.

Subsequently, as illustrated in FIG. 8, the profile calculating unit 201 calculates a periphery profile by sequentially acquiring pixel values of the contour pixels (expansion contour pixels) of the generated expansion area in Step d3. FIG. 10 is a diagram illustrating a periphery profile of the low-luminance area E2 illustrated in FIG. 9 and illustrates a change curve L32 of pixel values along the expansion contour line L31 with the horizontal axis representing a pixel position on the contour line (expansion contour line) L31 of the expansion area E3 illustrated in FIG. 9 and the vertical axis representing the pixel value of each corresponding pixel. The periphery profile calculated in Step d3 corresponds to a change in the pixel value of the expansion contour pixel along the expansion contour line L31 that is represented by the change curve L32 shown in FIG. 9.

Subsequently, as illustrated in FIG. 8, the minimum portion detecting unit 202 detects a minimum portion by calculating a minimum value of the periphery profile and sets a minimum proximity range in Step d5. For example, for the periphery profile illustrated in FIG. 10, a minimum value of the change curve L32 is calculated so as to detect a minimum portion P3. A proximity range including this minimum portion P3 is determined as a site at which a groove is present, and a predetermined range having the minimum portion P3 as its center is set as a minimum proximity range R3. The range as being the minimum proximity range R3 may be set in advance.

In order to set the minimum proximity range as above, as illustrated in FIG. 8, subsequently, the calculation range limiting unit 20 sets pixels positioned at both ends of the minimum proximity range as minimum both-end pixels and acquires the coordinates of the minimum both-end pixels in Step d7. Then, the calculation range limiting unit 20 acquires vectors (minimum end direction vectors) starting from the base point toward the minimum both-end pixels for each outside direction vector that is calculated for each contour pixel of the low-luminance area in Step c1 illustrated in FIG. 6 and determines whether a corresponding gradient vector is to be calculated based on the outer product of the minimum end direction vectors and the outside direction vector in Step d9.

Figure 11:
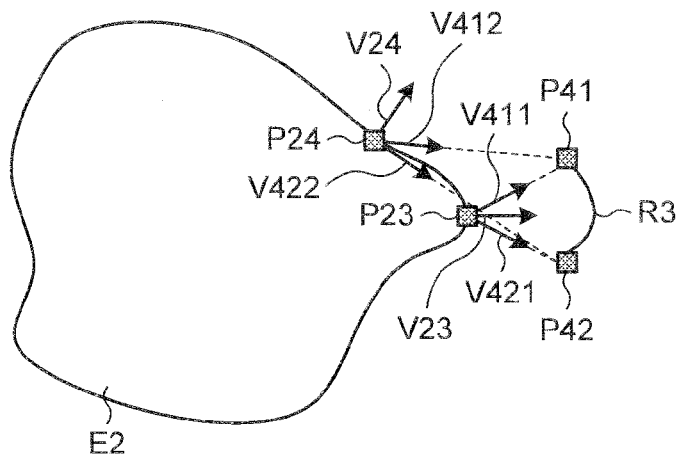
FIG. 11 is a diagram illustrating a determining process of determining whether to calculate a gradient vector or not.

FIG. 11 is a diagram illustrating a process of determining whether a corresponding gradient vector is calculated or not for outside direction vectors V23 and V24 that are normal line vectors having the contour pixels P23 and P24 as the base points thereof. In FIG. 11, the minimum proximity range R3 illustrated in FIG. 10 is represented. To be more precise, the range on the expansion contour line L31, which is illustrated in FIG. 9, corresponding to the minimum proximity range R3 illustrated in FIG. 10 is represented as the minimum proximity range R3.

In Step c9 illustrated in FIG. 6 in a later stage, a gradient vector is calculated with a pixel (outside direction pixel) that is apart from the base point of the outside direction vector by a predetermined distance in the direction of the outside direction vector being set as a base point. Thus, here, a gradient vector in which the outside direction pixel is within the minimum proximity range is not calculated. Described in more detail, in a case where an outside direction vector is placed toward the inside of the minimum proximity range, the outside direction pixel having the corresponding gradient vector as its base point is set within the minimum proximity range, that is, at the position of the groove, and accordingly, a corresponding gradient vector for the outside direction vector is not calculated.

For example, first, as illustrated in FIG. 11, pixels positioned at both ends of the minimum proximity range R3 are set as minimum both-end pixels P41 and P42, and the coordinates thereof area acquired. Then, for each outside direction vector, minimum end direction vectors starting from the base point thereof toward the minimum both-end pixels P41 and P42 are acquired, and the outer product of the minimum end direction vector and the outside direction vector are calculated.

For example, when an outside direction vector V23 is considered, the outer product (V411×V23) of a minimum end direction vector V411 starting from a contour pixel P23 as its base point toward a minimum both-end pixel P41 and the outside direction vector V23 is calculated, and the outer product (V23×V421) of an outside direction vector V23 and a minimum end direction vector V421 starting from the contour pixel P23 toward a minimum both-end pixel P42 is calculated. Here, since the outside direction vector V23 is positioned toward the inside of the minimum proximity range R3, the signs of the acquired outer products are the same. As above, in a case where the signs of the outer products are the same, it is determined that a corresponding gradient vector is not calculated.

On the other hand, when an outside direction vector V24 is considered, similarly to the case of the outside direction vector V23 as its base point, the outer product (V412×V24) of a minimum end direction vector V412 starting from a contour pixel P24 toward the minimum both-end pixel P41 and the outside direction vector V24 is calculated, and the outer product (V24×V422) of an outside direction vector V24 and a minimum end direction vector V422 starting from the contour pixel P24 toward the minimum both-end pixel P42 is calculated. Here, since the outside direction vector V24 is not positioned toward the inside of the minimum proximity range R3, the signs of the acquired outer products are not the same. As above, in a case where the signs of the outer products are not the same, it is determined that a corresponding gradient vector is calculated.

Here, although it is determined whether a corresponding gradient vector is calculated based on whether the signs of the outer products are the same or not, the present invention is not limited thereto, and it may be checked whether the outside direction vector is positioned toward the inside of the minimum proximity range. For example, the determination may be made based on whether the signs of the coefficients of the minimum end direction vectors are the same or not when the outside direction vectors are represented by two minimum end direction vectors. For example, in a case where the outside direction vector V23 illustrated in FIG. 11 is represented by the minimum end direction vectors V411 and V421, the signs of the coefficients of the minimum end direction vectors V411 and V421 are the same. In such a case, it is determined that a corresponding gradient vector is not calculated. On the other hand, in a case where the outside direction vector V24 is represented by the minimum end direction vectors V412 and V422, the signs of the coefficients of the minimum end direction vectors V412 and V422 are not the same. In such a case, it is determined that a corresponding gradient vector is calculated.

When it is determined whether or not gradient vectors corresponding to all the outside direction vectors having the contour pixels of the low-luminance area as a processing target as the base points are calculated, the calculation range limiting process ends, and the process is returned to Step c3 illustrated in FIG. 6.

When the calculation range limiting process ends, subsequently, the process of loop C is performed for each outside direction vector within the calculation range, that is, for each outside direction vector for which a corresponding gradient vector is determined to be calculated in the calculation range limiting process of Step c3 in Steps c5 to c11. In this loop C, first, the periphery smoothing unit 21 performs a periphery smoothing process and performs smoothing for a reference pixel range that is referred to when a gradient vector corresponding to the outside direction vector as a processing target is calculated in Step c7. Since the mucous membrane of the inner wall of gastrointestinal track that is reflected onto the intraluminal image has many asperities on the surface due to villi or the like, there is a case where an appropriate gradient vector cannot be acquired. The periphery smoothing process performed in Step c7 is performed so as to arrange the shape unevenness due to villi as described above within the pixel range (reference pixel range) that is referred to when a gradient is calculated. Here, for example, the smoothing is performed by acquiring a frequency component within the reference pixel range.

Figure 12:
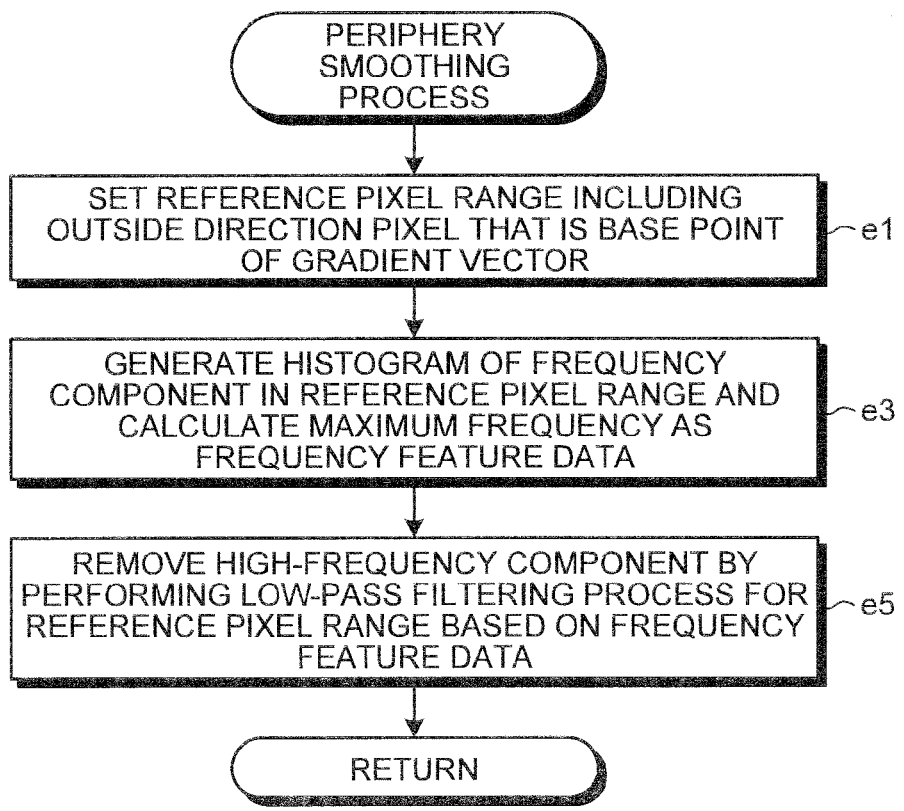
FIG. 12 is a flowchart illustrating a detailed processing sequence of a periphery smoothing process according to the first embodiment.

FIG. 12 is a flowchart illustrating a detailed processing sequence of a periphery smoothing process according to the first embodiment. In the periphery smoothing process, as illustrated in FIG. 12, first, the area smoothing unit 155 sets a pixel that is located apart from the base point of an outside direction vector as a processing target by a predetermined distance in the direction of the outside direction vector as an outside direction pixel and sets a rectangular area of a predetermined size that includes this outside direction pixel as a reference pixel range in Step e1. The size of the rectangular area as the reference pixel range may be set in advance and may be an appropriate size.

Subsequently, the frequency feature data calculating unit 211 calculates frequency feature data in Step e3. Described in more detail, the frequency feature data calculating unit 211, first, transforms the reference pixel range into a frequency space through a Fourier transform so as to acquire a frequency component within the reference pixel range, as the process of Step e3. Then, the frequency feature data calculating unit 211 generates a histogram of the acquired frequency component, calculates a frequency (maximum frequency) at which the frequency components is the maximum as a dominant frequency within the reference pixel range, and sets the dominant frequency as the frequency feature data.

Then, the high-frequency component removing unit 212 removes a high-frequency component within the reference pixel range by performing a known low-pass filtering process for the reference pixel range based on the frequency feature data, which is calculated in Step e3, in Step e5. Thereafter, the process is returned to Step c7 illustrated in FIG. 6 and proceeds to Step c9.

Here, the process of Step e5 is not limited to the low-pass filtering process and may be a process that can arrange the shape unevenness due to villi or the like. For example, a known morphological process (reference: Obata Hidefumi, "Morphology", Corona Publishing Co., Ltd.) may be performed as the above-described process. Here, there are an opening process and a closing process in the morphological process. The opening process is a process of acquiring a locus through which a maximum value of the outer periphery of a structure element passes when a reference diagram called structure element is brought into contact with a three-dimensional face formed by pixel values of a target image to the lower side and is moved in a three-dimensional space in which each pixel value is regarded as elevation. On the other hand, the closing process is a process of acquiring a locus through which a minimum value of the outer periphery of the structure element passes when the structure element is brought into contact with the three-dimensional face formed by pixel values of a target image to the upper side and is moved in the same three-dimensional space. Here, for example, by performing the morphological process by using the structure element of a size corresponding to the frequency feature data (maximum frequency), a high-frequency component within the reference pixel range is removed. The size S of the structure element corresponding to the frequency feature data, for example, is determined by using the following Equation (2). Here, f represents a maximum frequency, and W represents the width of the rectangular area as the above-described reference pixel range. In addition, α is an arbitrary constant number.

$$S = \alpha \times W/f \qquad (2)$$

In the following Step c9 illustrated in FIG. 6, the gradient vector calculating unit 19 calculates a gradient vector corresponding to the outside direction vector as a processing target. The gradient vector described here is a vector that has an outside direction pixel as a base point and is a vector representing the direction of a pixel having the smallest pixel value within the reference pixel range. The calculating of the gradient vector may be performed by using a known technique. For example, the gradient direction vector is calculated by applying a Sobel filter to the outside direction pixel along the x direction within the reference pixel range and applying a Sobel filter to the outside direction pixel along the y direction within the reference pixel range.

Then, the above-described process of loop C is performed for all the outside direction vectors within the calculation range. When the process of this loop C is completed, subsequently, the concentration ratio calculating unit 17 calculates the inner product of each outside direction vector (unit vector) within the calculation range and a corresponding gradient vector (unit vector) in Step c13. Then, the concentration ratio calculating unit 17 calculates an average value of the inner products calculated for the outside direction vectors within the calculation range and sets a value acquired by multiplying the average value by "−1" as the concentration ratio of the gradient in Step c15. Thereafter, the process is returned to Step a11 illustrated in FIG. 4 and proceeds to Step a13.

Then, in Step a13, the dark portion area determining unit 24 determines whether or not the low-luminance area as a processing target is a dark portion area based on the concentration ratio that is calculated in Step a11. Described in more detail, the dark portion area determining unit 24 determines that the low-luminance area as a processing target as a dark portion area in a case where the concentration ratio of the gradient is a threshold value set in advance or more. When it is determined whether the low-luminance area is a dark potion area or not as described above, the process of loop A for the low-luminance area as a processing target ends. Then, the above-described process of loop A is performed for all the low-luminance areas.

As described above, according to the first embodiment, first, low-luminance areas are detected based on the pixel values of pixels of an intraluminal image. Then, the peripheral feature data is calculated based on the peripheral pixel values for each detected low-luminance area. Described in more detail, based on a feature that the change in the pixel value is inclined toward a dark portion area (the pixel value decreases toward a dark portion area) on the periphery of the dark portion area, the concentration ratio of the gradient is calculated as the peripheral feature data. Then, a dark portion area is extracted by determining whether each dark portion candidate area is the dark portion area based on the peripheral feature data. According to this first embodiment, a dark portion area can be extracted with an area other than the dark portion area such as an area of coagulated blood or the like of which the color is similar to that of the dark portion area out of low-luminance areas being excluded. Accordingly, advantages that a dark portion area is properly determined, and a dark portion area can be extracted with high accuracy can be acquired.

For the intraluminal image from which the dark portion area is extracted as above, a process of extracting an abnormal portion area such as a lesion area or a bleeding area is performed. Then, the intraluminal image is appropriately displayed on the display unit 13 so as to be presented to a user such as a doctor. Described in more detail, the intraluminal image is displayed on the display unit 13 as an image in which, for example, an abnormal portion area can be identified from other areas. Alternatively, the intraluminal image including the abnormal portion area is displayed on the display unit 13 as an image used for diagnosis. At this time, by applying the first embodiment, an area to be focused is specified by excluding the extracted dark portion area, and an abnormal portion area can be extracted from the area to be focused, whereby detection of an abnormal portion can be performed with high accuracy.

First Modification

In the first embodiment, as described with reference to FIG. 7, a normal-line vector for the contour of the low-luminance area is calculated as an outside direction vector. However, the outside direction vector may be any vector positioned from the low-luminance area toward the outside direction and is not limited to the normal-line vector described in the first embodiment.

Figure 13:
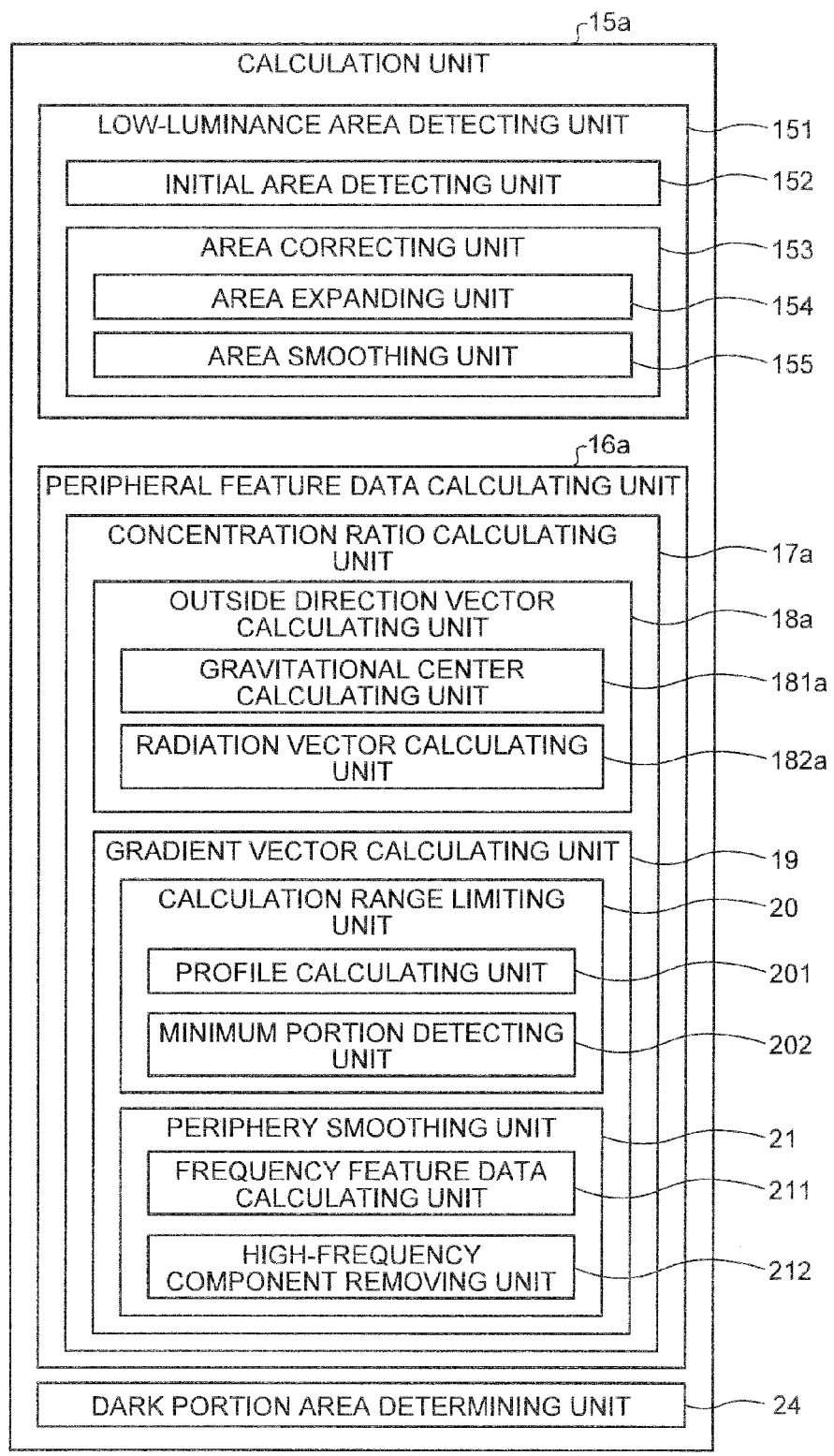
FIG. 13 is a diagram illustrating a configuration of a calculation unit of an image processing apparatus according to a first modification.

FIG. 13 is a diagram illustrating the configuration of a calculation unit 15a of an image processing apparatus according to a first modification. The image processing apparatus according to the first modification can be realized by replacing the calculation unit 15 of the image processing apparatus 1 according to the first embodiment illustrated in FIG. 1 with a calculation unit 15a illustrated in FIG. 13. In FIG. 13, the same reference numeral is assigned to the same configuration as that of the first embodiment. As illustrated in FIG. 13, according to the first modification, in a concentration ratio calculating unit 17a included in a peripheral feature data calculating unit 16a, an outside direction vector calculating unit 18a is different from that of the first embodiment. The outside direction vector calculating unit 18a calculates a radiation direction vector that is positioned from the gravitational center of the low-luminance area toward a radiation direction as the outside direction vector. This outside direction vector calculating unit 18a includes a gravitational center calculating unit 181a as a unit used for calculating the gravitational center of the low-luminance area and a radiation vector calculating unit 182a as a unit used for calculating a radiation vector that calculates a vector positioned from the gravitational center toward the radiation direction as a radiation direction vector.

Figure 14:
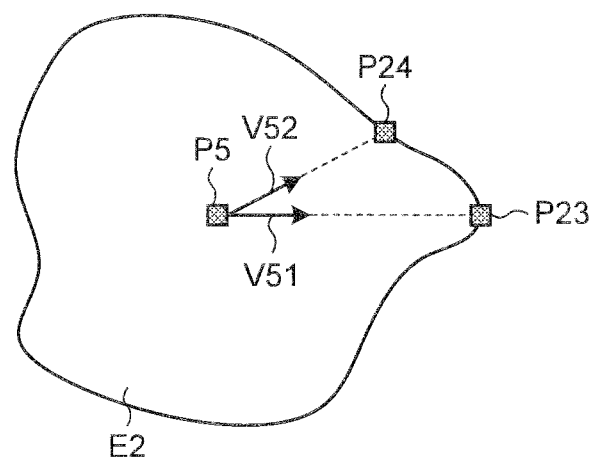
FIG. 14 is a diagram illustrating an outside direction vector according to the first modification.

In this case, the process described in Step c1 illustrated in FIG. 6 is replaced, and, first, the gravitational center calculating unit 181a calculates the gravitational center of the low-luminance area, and thereafter, the radiation vector calculating unit 182a calculates a radiation direction vector for each contour pixel. FIG. 14 is a diagram illustrating an outside direction vector according to the first modification and illustrates radiation direction vectors V51 and V52 that are calculated for contour pixels P23 and P24 illustrated in FIG. 11. According to the first modification, the gravitational center P5 of the low-luminance area E2 is set as a base point, and the radiation direction vector V51 passing through the contour pixel P23 is calculated as the outside direction vector of the contour pixel P23. Similarly, the radiation direction vector V52 passing through the contour pixel P24 is calculated as an outside direction vector of the contour pixel P24. In a practical process, for each contour pixel, the gravitational center of the low-luminance area is set as a base point, and a radiation direction vector passing through a corresponding contour pixel is calculated as an outside direction vector.

Here, the method of limiting the gradient vector calculating range is not limited to that described in the first embodiment. For example, the method described in a second modification or a third modification may be used.

Second Modification

Figure 15:
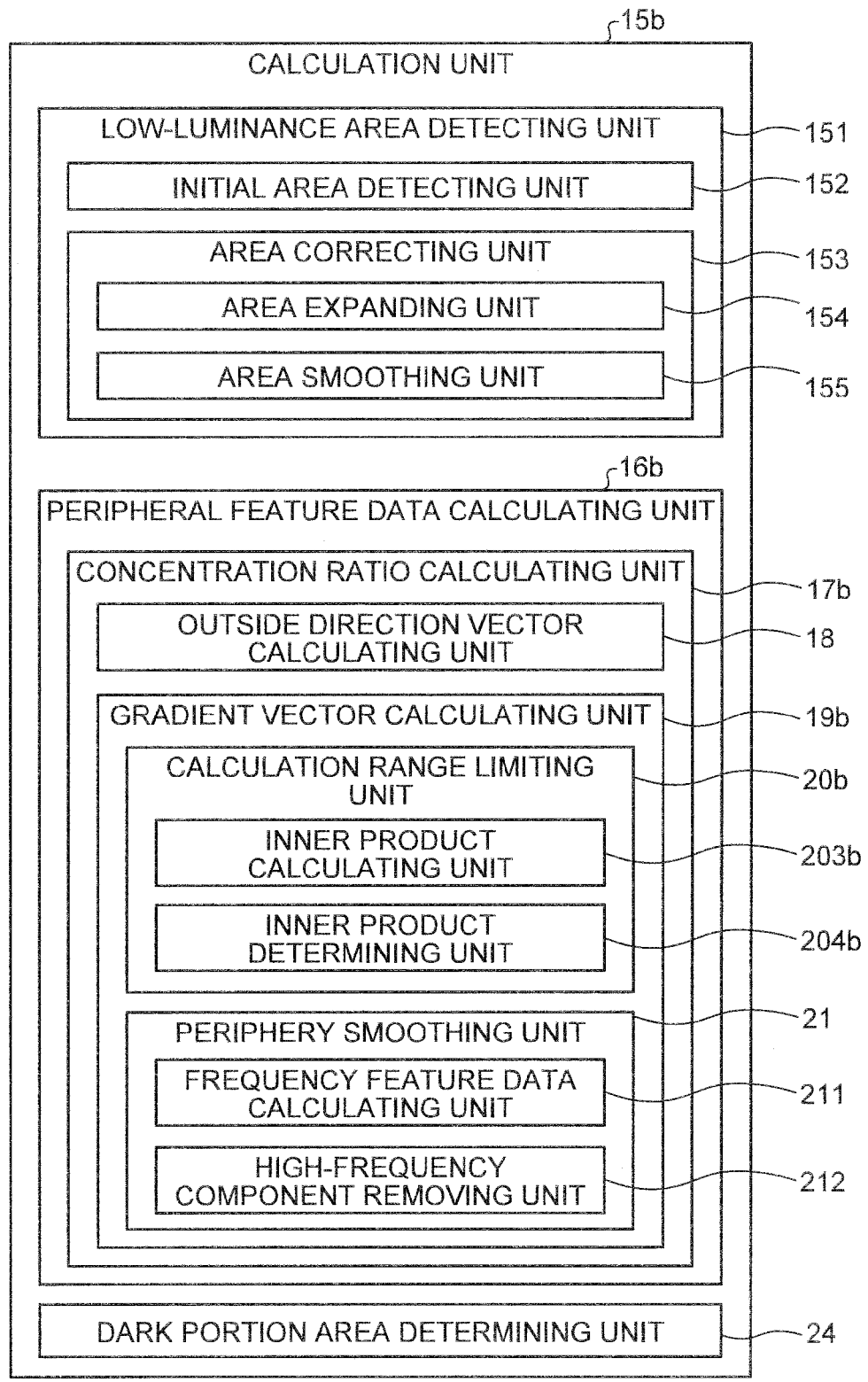
FIG. 15 is a diagram illustrating a configuration of a calculation unit of an image processing apparatus according to a second modification.

FIG. 15 is a diagram illustrating the configuration of a calculation unit 15b of an image processing apparatus according to a second modification. The image processing apparatus according to the second modification can be realized by replacing the calculation unit 15 of the image processing apparatus 1 according to the first embodiment illustrated in FIG. 1 with a calculation unit 15*b* illustrated in FIG. 15. In FIG. 15, the same reference numeral is assigned to the same configuration as that of the first embodiment. As illustrated in FIG. 15, according to the second modification, in a concentration ratio calculating unit 17*b* included in a peripheral feature data calculating unit 16*b* of the calculation unit 15*b*, a calculation range limiting unit 20*b* of a gradient vector calculating unit 19*b* is different from that of the first embodiment. The calculation range limiting unit 20*b* includes an inner product calculating unit 203*b* as a unit used for calculating an inner product and an inner product determining unit 204*b* as a unit used for determining an inner product. The inner product calculating unit 203*b*, for each contour pixel of the low-luminance area, sets the contour pixel as a base point and calculates an inner product of vectors (proximity contour pixel direction vectors) positioned toward other contour pixels that are present on both sides with the contour pixel located at the base point interposed therebetween. The inner product determining unit 204*b* determines whether or not there is a steep gradient on the periphery of the low-luminance area based on the magnitude of the inner product of the proximity contour pixel direction vectors calculated for each contour pixel of the low-luminance area.

Figure 16:
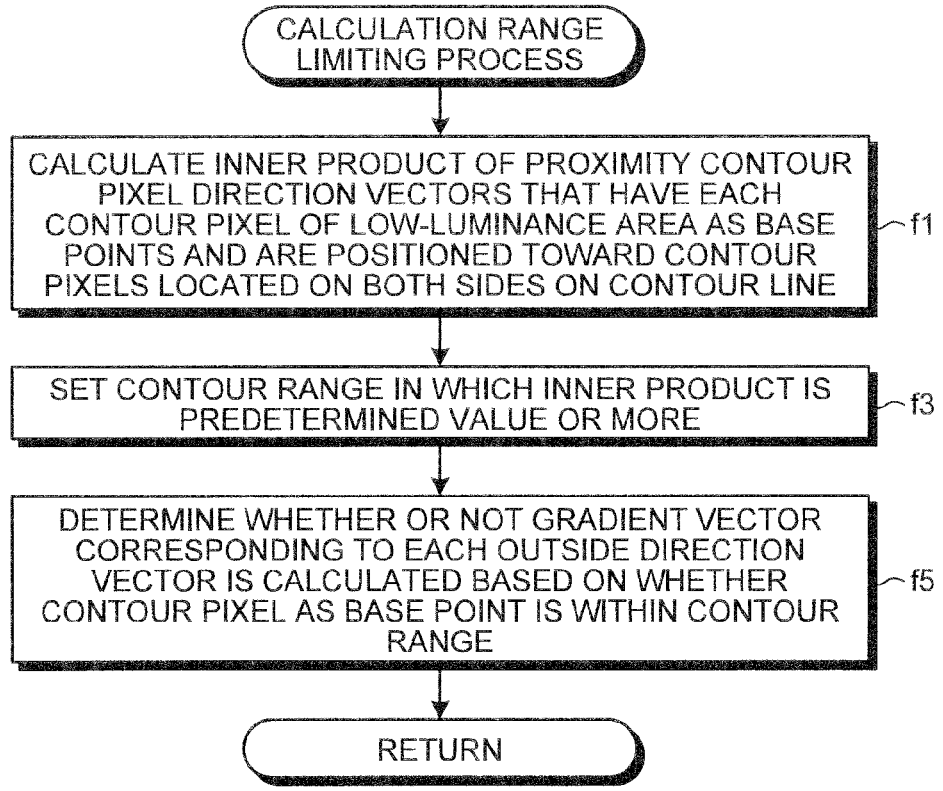
FIG. 16 is a flowchart illustrating a detailed processing sequence of a calculation range limiting process according to the second modification.

FIG. 16 is a flowchart illustrating a detailed processing sequence of a calculation range limiting process according to the second modification. In the second modification, the calculation range limiting process, which is illustrated in FIG. 8, described as the process of Step c3 illustrated in FIG. 6 in the first embodiment is replaced, and a calculation range limiting process illustrated in FIG. 16 is performed. In this calculation range limiting process, as illustrated in FIG. 16, first, an inner product calculating unit 203*b* calculates an inner product of the proximity contour pixel direction vectors for each contour pixel of the low-luminance area in Step f1.

Figure 17:
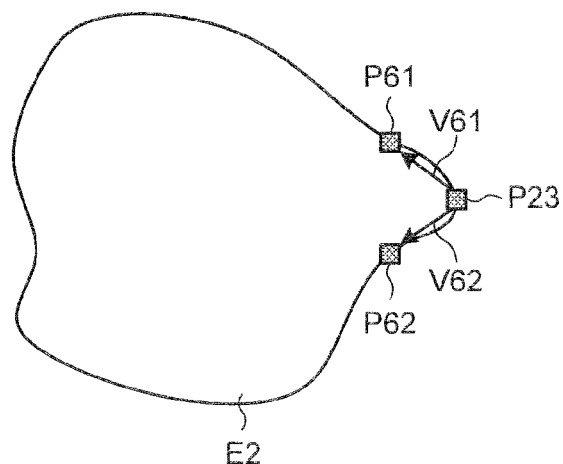
FIG. 17 is a diagram illustrating an adjacent contour pixel directional vector.

FIG. 17 is a diagram illustrating proximity contour pixel direction vectors V61 and V62 that have a contour pixel P23 as the base point thereof. The processing sequence of Step f1 illustrated in FIG. 16 will be described with focusing on the contour pixel P23 illustrated in FIG. 17. First, two contour pixels present at positions apart from each other by a predetermined distance on both sides of the contour line of a low-luminance area E2 with the contour pixel P23 interposed therebetween are set as proximity contour pixels P61 and P62, and the coordinates thereof are acquired. Then, the contour pixel P23 is set as a base point, and an inner product (V61·V62) of the proximity contour pixel direction vectors V61 and V62 positioned toward the selected proximity contour pixels P61 and P62 is calculated. The smaller the angle formed by the proximity contour direction vectors is, the greater the value of the inner product of the proximity contour pixel direction vectors, which is calculated as above, becomes.

The positions on the contour line at which the value of the inner product is great (the angle formed by the proximity contour pixel direction vectors is small) as above are, as illustrated in FIG. 17, positions at which the contour line protrudes (forming a convex) toward the outer side. In many case, the boundary of a dark portion area in an intraluminal image is also a boundary of the mucous membrane area that is present on the periphery. Here, a case where a dark portion area protrudes toward the outer side is a case where the boundary (contour) of het mucous membrane area is greatly depressed (concaved) on the inner side. However, it is rare for the mucous membrane to have a shape in which the surface is depressed from the structure thereof. Accordingly, in a case where the contour of the dark portion area protrudes toward the outer side, the outer side can be assumed to be near the boundary of another mucous membrane, that is, near a groove. Thus, according to the second modification, it is determined whether or not a gradient vector is calculated based on the value of the inner product of the proximity contour pixel direction vector.

Subsequently, the inner product determining unit 204*b* determines the value of the inner product and sets a contour range in which the value of the inner product is a predetermined value or more in Step f3. Then, the calculation range limiting unit 20*b* determines whether or not a gradient vector corresponding to each outside direction vector is calculated based on whether the contour pixel as a base point is within the set contour range in Step f5. Described in more detail, it can be assumed that a site (groove position) having a steep gradient is present on the outer periphery side of the set contour range, and accordingly, a gradient vector corresponding to the outside direction vector using a contour pixel within the contour range used as a base point is not calculated. According to the second modification, the calculating of a gradient vector using a site at which a groove is present as a base point is prevented, and therefore, a reduction of the calculation accuracy of the concentration ratio of the gradient can be suppressed.

Third Modification

Figure 18:
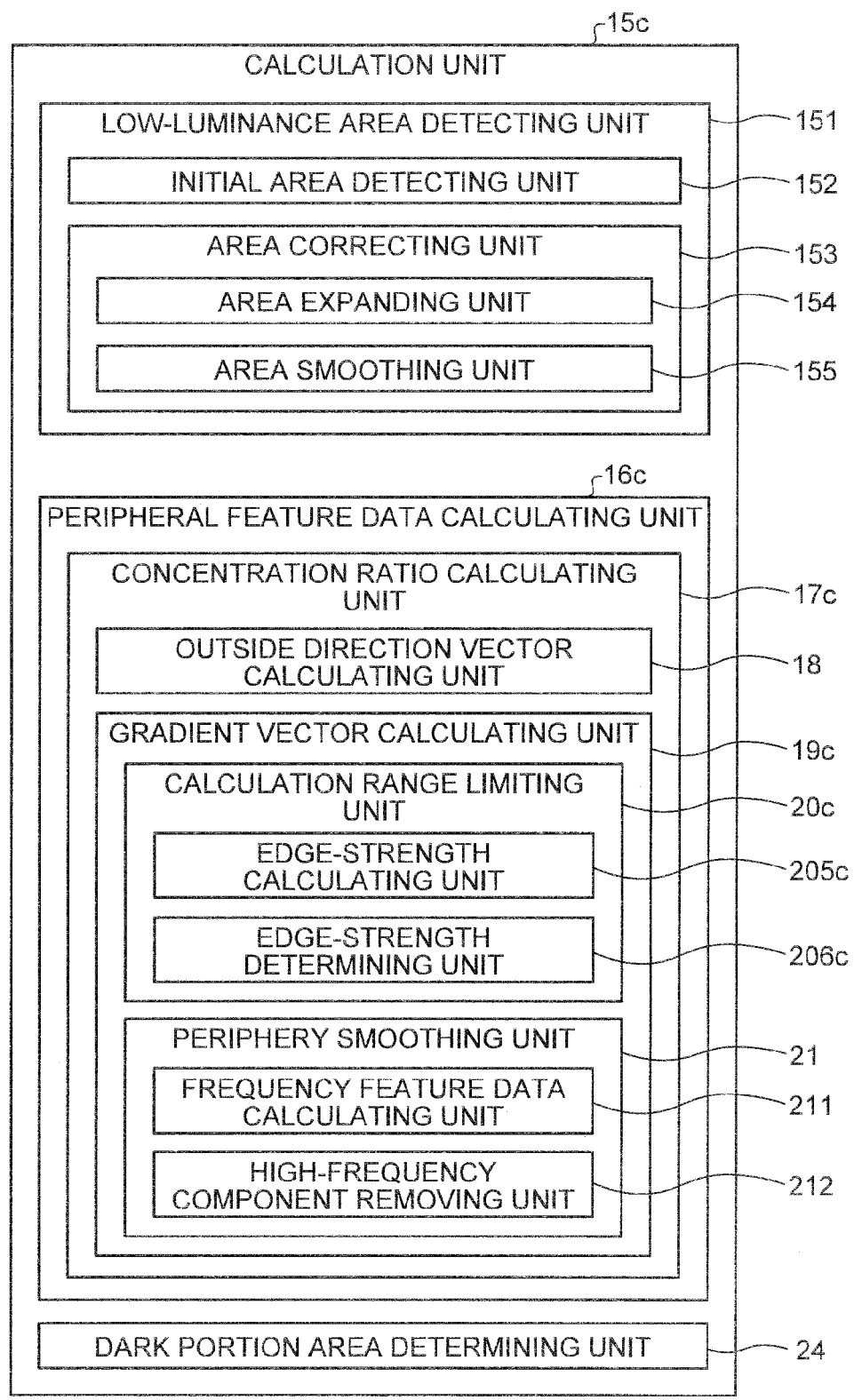
FIG. 18 is a diagram illustrating a configuration of a calculation unit of an image processing apparatus according to a third modification.

FIG. 18 is a diagram illustrating the configuration of a calculation unit 15*c* of an image processing apparatus according to a third modification. The image processing apparatus according to the third modification can be realized by replacing the calculation unit 15 of the image processing apparatus 1 according to the first embodiment illustrated in FIG. 1 with a calculation unit 15*c* illustrated in FIG. 18. In FIG. 18, the same reference numeral is assigned to the same configuration as that of the first embodiment. As illustrated in FIG. 18, according to the third modification, in a concentration ratio calculating unit 17*c* included in a peripheral feature data calculating unit 16*c* of the calculation unit 15*c*, a calculation range limiting unit 20*c* of a gradient vector calculating unit 19*c* is different from that of the first embodiment. The calculation range limiting unit 20*c* includes an edge-strength calculating unit 205*c* as a unit for calculating edge strength, which calculates the edge strength on the periphery of the low-luminance area, and an edge-strength determining unit 206*c* as a unit for determining the edge strength, which determines whether or not there is a steep gradient present on the periphery of the low-luminance area based on the edge strength.

Figure 19:
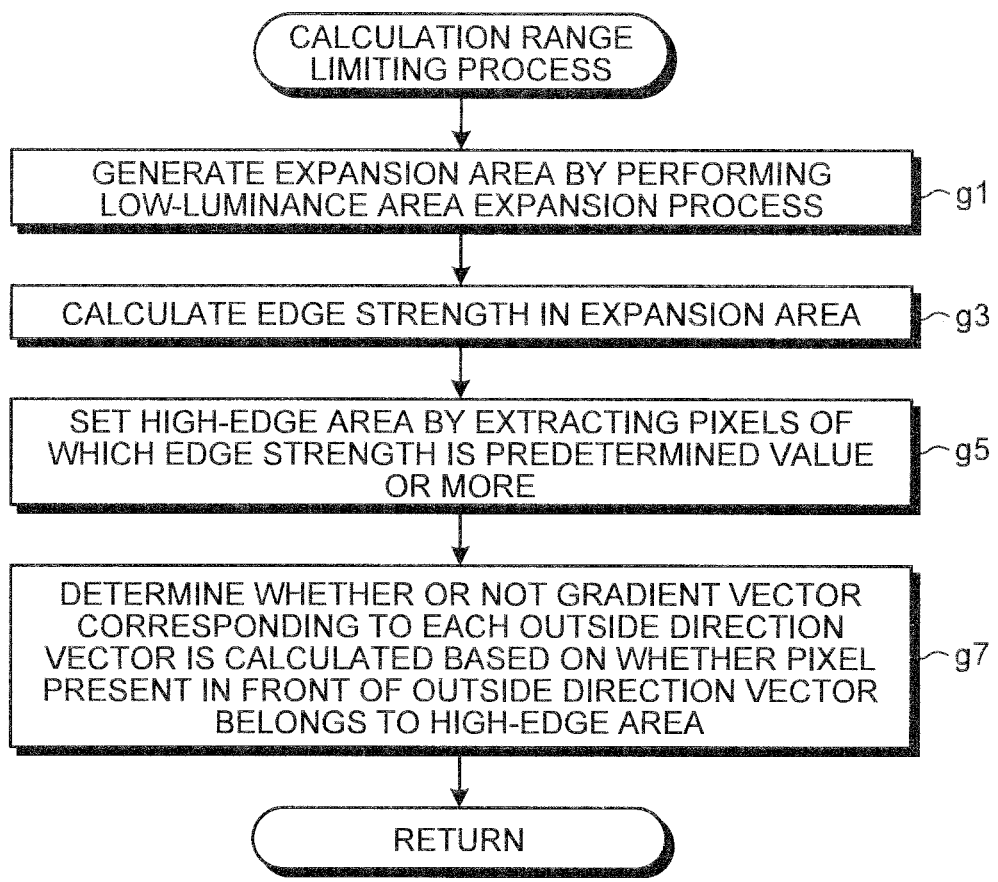
FIG. 19 is a flowchart illustrating a detailed processing sequence of a calculation range limiting process according to the third modification.

FIG. 19 is a flowchart illustrating a detailed processing sequence of a calculation range limiting process according to the third modification. According to the third modification, the calculation range limiting process, which is illustrated in FIG. 8, described as the process of Step c3 illustrated in FIG. 6 in the first embodiment is replaced with a calculation range limiting process illustrated in FIG. 19. In the calculation range limiting process according to this third modification, as illustrated in FIG. 19, first, the edge-strength calculating unit 205*c* performs an expansion process of a low-luminance area so as to expand the low-luminance area and generate an expansion area on the outer periphery in Step g1. The process here can be realized by the same process as that of Step d1 illustrated in FIG. 8. Then, the edge-strength calculating unit 205*c* calculates edge strength for each pixel within the generated expansion area of the low-luminance area in Step g3. The calculation of the edge strength can be performed by using the same method as that described in the processing sequence of Step a3 illustrated in FIG. 4. In addition, in a case where the edge strength of each pixel that is calculated in Step a3 is stored in a recording unit 14 (see FIG. 1), the process of Step g3 illustrated in FIG. 19 is unnecessary, and the edge strength of pixels within the expansion area that is generated in Step g1 may be read out from the recording unit 14.

Subsequently, the edge-strength determining unit 206c extracts pixels within the expansion area of which edge strength is a predetermined value set in advance or more and sets the extracted pixel group as a high-edge area, and accordingly, it is determined whether or not there is a steep gradient (that is, a groove position) present in the expansion area of the low-luminance area in Step g5. Then, the calculation range limiting unit 20c determines whether or not a gradient vector is calculated based on whether the previous pixel belongs to a high-edge area for each outside direction vector of each contour pixel in Step g7. In a case where a pixel present at the end of the outside direction vector belongs to the high-edge area, there is a high possibility that a groove is present at the end of the outside direction vector, and an outside direction pixel used as a base point of the gradient vector is set as the area of the groove. Accordingly, in Step g5, in a case where a pixel present at the end of the outside direction vector belongs to the high-edge area, a corresponding gradient vector is not calculated. According to this third modification, the calculation of a gradient vector using a site at which a groove is present is prevented, and a reduction of the calculation accuracy of the concentration ratio of the gradient can be suppressed.

Second Embodiment

Figure 20:
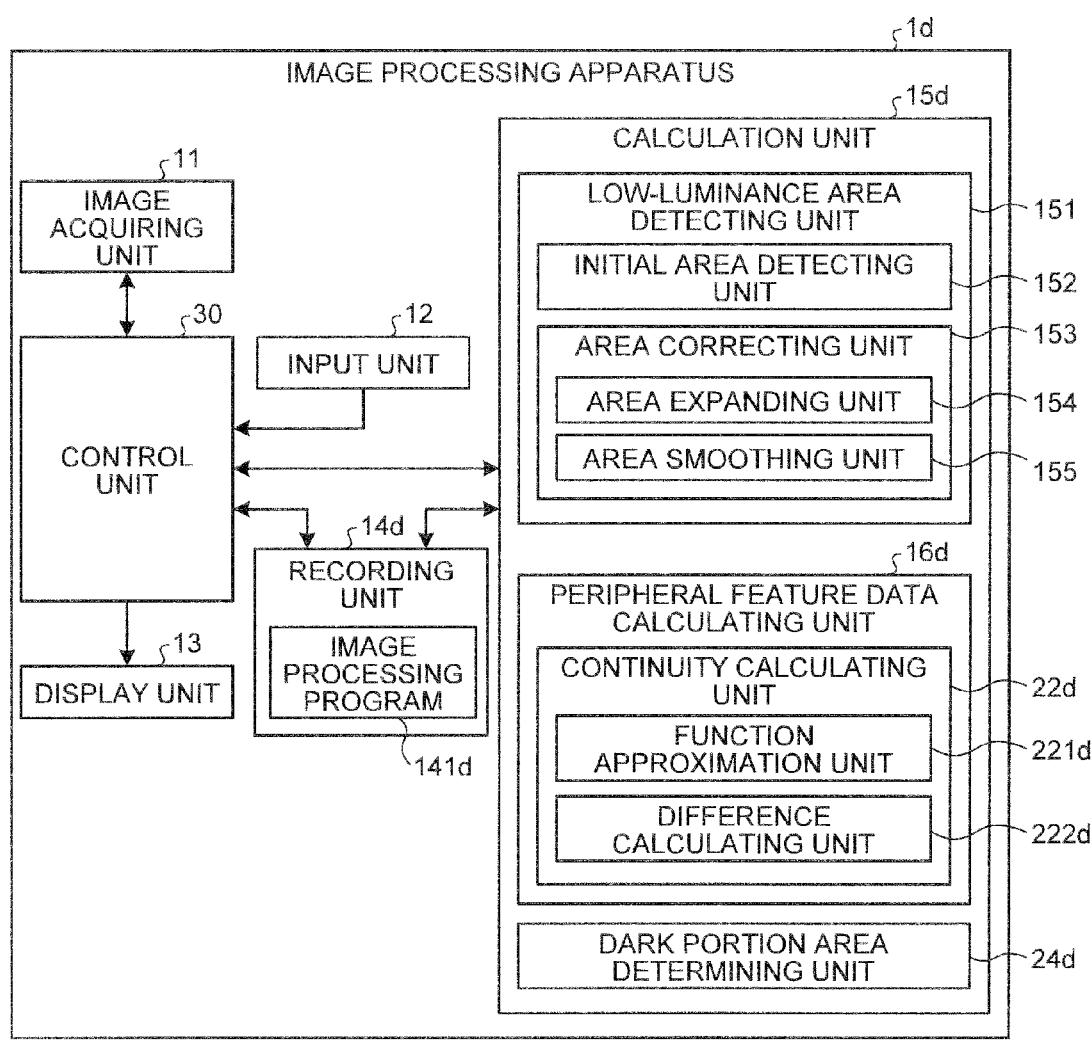
FIG. 20 is a block diagram illustrating a functional configuration of an image processing apparatus according to a second embodiment.

First, the configuration of an image processing apparatus according to a second embodiment will be described. FIG. 20 is a block diagram illustrating the functional configuration of an image processing apparatus 1d according to the second embodiment. Here, the same reference numeral is assigned to the same configuration as that described in the first embodiment. The image processing apparatus 1d according to the second embodiment, as illustrated in FIG. 20, includes an image acquiring unit 11, an input unit 12, a display unit 13, a recording unit 14d, a calculation unit 15d, and a control unit 30 that controls the overall operation of the image processing apparatus 1d.

In the recording unit 14d, an image processing program 141d used for detecting a dark portion area from an intraluminal image based on periphery continuity that represents a change in the pixel value between opposing periphery portions as an example of the peripheral feature data is recorded. Here, the opposing periphery portions represent portions that are adjacent to the low-luminance area and oppose each other.

The calculation unit 15d includes a low-luminance area detecting unit 151, a peripheral feature data calculating unit 16d, and a dark portion area determining unit 24d. In the second embodiment, the peripheral feature data calculating unit 16d is a functional unit that calculates the peripheral feature data of a low-luminance area based on pixel values of the periphery of the low-luminance area and includes a continuity calculating unit 22d, which calculates periphery continuity, as a unit used for calculating the periphery continuity. This continuity calculating unit 22d includes a function approximation unit 221d as a unit used for function approximation and a difference calculating unit 222d as a unit used for calculating a difference. The function approximation unit 221d approximates each opposing periphery portion as a function formula of a face based on pixel values within two opposing periphery portions opposing each other with the low-luminance area interposed therebetween. The difference calculating unit 222d calculates a difference between values of the function formulas for the same coordinates based on the approximated function formulas of two opposing periphery portions. In addition, the dark portion area determining unit 24d determines whether or not a low-luminance area is a dark portion area based on the periphery continuity that is calculated by the peripheral feature data calculating unit 16d as the peripheral feature data of the low-luminance area.

Figure 21:
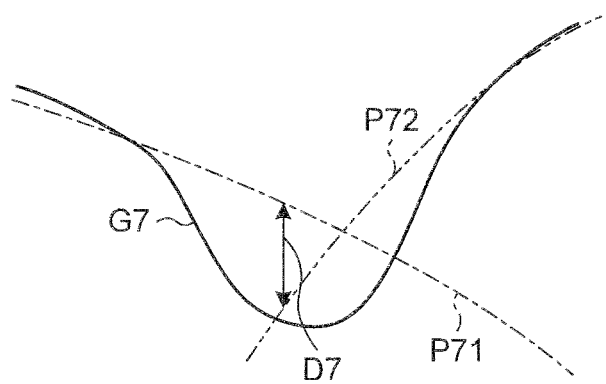
FIG. 21 is a diagram illustrating a change in pixel value between a dark portion area and an opposing periphery portion thereof.
Figure 22:
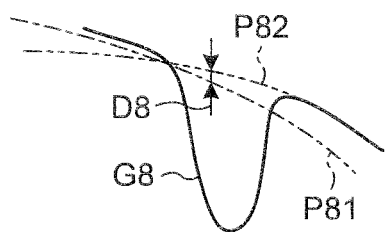
FIG. 22 is a diagram illustrating a change in pixel value between a black area other than a dark-portion area and an opposing periphery portion thereof.

First, the principle of detecting a dark portion area according to the second embodiment will be described. FIG. 21 is a diagram illustrating a change G7 in the pixel value in a dark portion area and opposing periphery portions opposing each other with the dark portion area interposed therebetween. FIG. 22 is a diagram illustrating a change G8 in the pixel value in a black area, for example, of coagulated blood or the like other than the dark-portion area and opposing periphery portions opposing each other with the black area interposed therebetween. Described in more detail, FIGS. 21 and 22 illustrate changes G7 and G8 in the pixel value in a cross-section of a distribution of pixel values, in which pixel values in the dark portion area and opposing periphery portions thereof or the black area and opposing periphery portions thereof are represented as elevation, taken along a predetermined direction.

As described in the first embodiment, in a case where a low-luminance area is a dark portion area, there is a feature that the change in the pixel value is inclined toward the dark portion area in the entire area of the periphery thereof, and accordingly, there is no continuity in the change in the pixel value between the opposing periphery portions having the low-luminance area interposed therebetween. When function formulas that approximate the shapes of the curved faces of the opposing periphery portions are acquired based on the pixel values within the opposing periphery portion, which have no continuity as described above, as illustrated in FIG. 21, a difference value D7 of pixel values at the same coordinates on the approximated curved faces P71 and P72 increases.

In contrast to this, in a case where a low-luminance area is a black area of coagulated blood or the like, the pixel values on the periphery thereof are inclined toward the side of the dark portion area on the whole, and accordingly, there is a feature that there is continuity in the changes in the pixel value between the opposing periphery portions. For example, in the examples illustrated in FIGS. 2 and 3 referred to in the first embodiment, both the changes in the pixel value in the areas 521 and 522 on the periphery of the black area 52 are inclined toward the lower right side denoted by arrows A13 and A14. When function formulas that approximate the shapes of the curved faces of the opposing periphery portions are acquired based on the pixel values within the opposing periphery portions, which have continuity as described above, as illustrated in FIG. 22, a difference value D8 between pixel values at the same coordinates on the approximated curved faces P81 and P82 decreases. Thus, in the second embodiment, first, a low-luminance area that is a candidate for a dark portion area is detected from the intraluminal image. Then, by focusing on the detected continuity of the change in the pixel values between the opposing periphery portions, it is determined whether or not the detected low-luminance area is a dark area, and the dark area is extracted.

Figure 23:
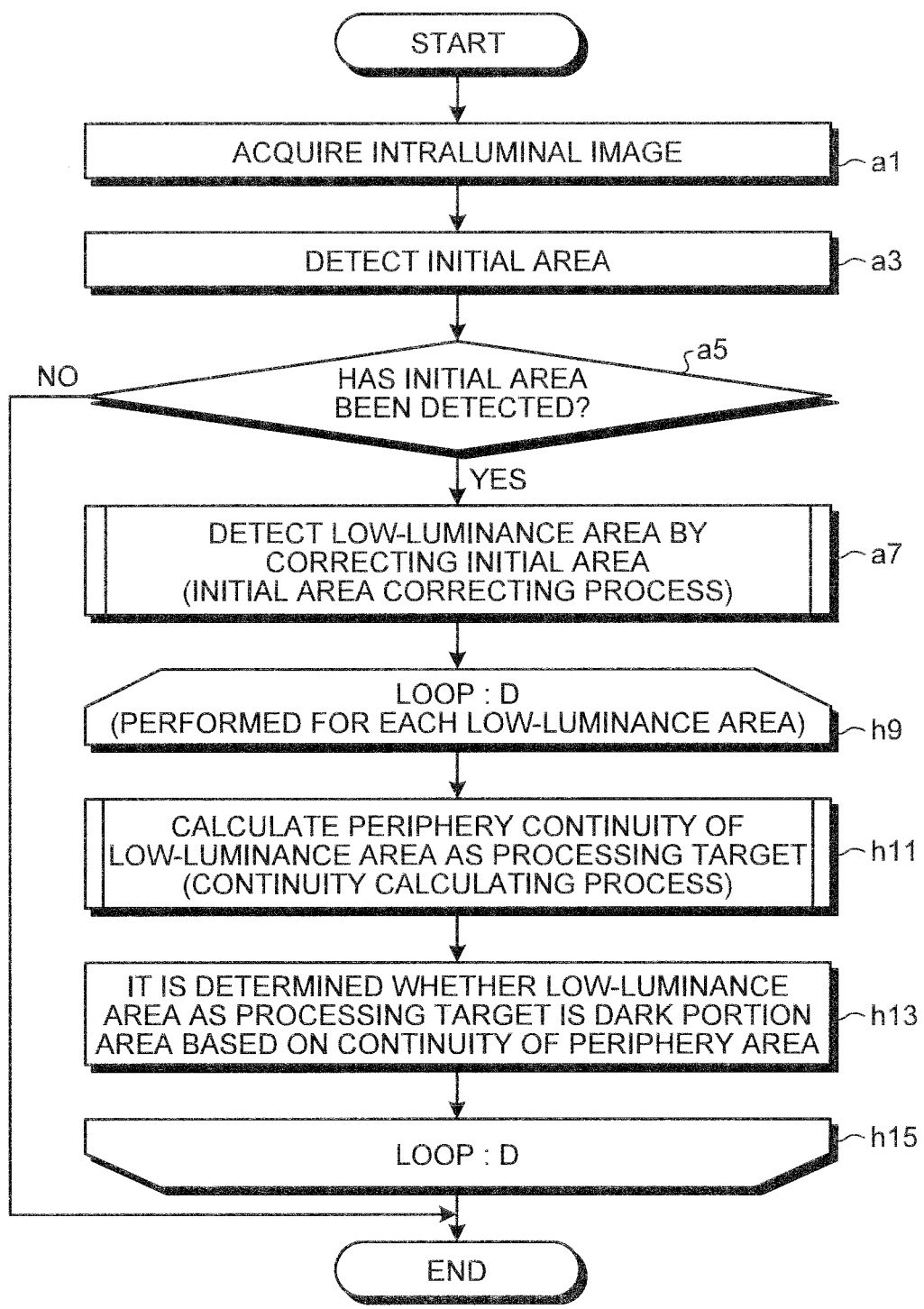
FIG. 23 is an overall flowchart illustrating a processing sequence performed by an image processing apparatus according to the second embodiment.

Next, a detailed processing sequence performed by the image processing apparatus 1d according to the second embodiment will be described. FIG. 23 is an entire flowchart illustrating the processing sequence performed by an image processing apparatus 1d according to the second embodiment. The process described here is realized by executing the image processing program 141d that is recorded in the recording unit 14d by using the calculation unit 15d. In FIG. 23, the same reference numeral is assigned to the same processing sequence as that of the first embodiment.

As illustrated in FIG. 23, according to the second embodiment, after the area correcting unit 153 detects low-luminance areas by performing an initial area correcting process in Step a7, the process of loop D is performed for each low-luminance area in Steps h9 to h15. In this loop D, first, the continuity calculating unit 22d performs a continuity calculating process, and the periphery continuity is calculated for the low-luminance area as a processing target in Step h11.

Figure 24:
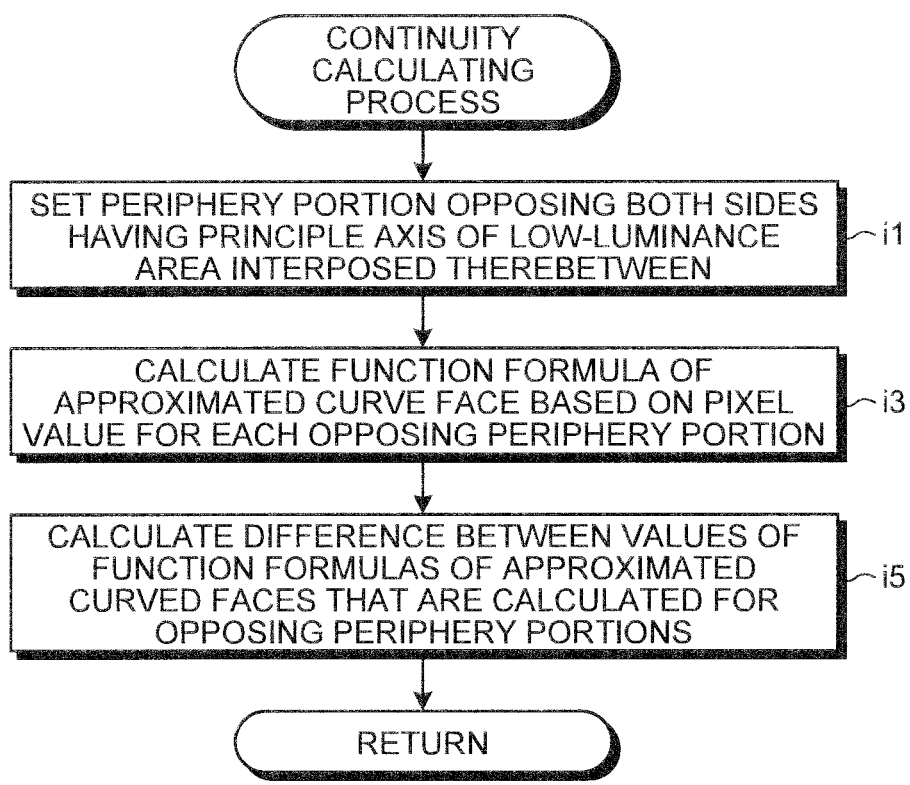
FIG. 24 is a flowchart illustrating a detailed processing sequence of a continuity calculating process according to the second embodiment.

FIG. 24 is a flowchart illustrating a detailed processing sequence of the continuity calculating process according to the second embodiment. In the continuity calculating process, as illustrated in FIG. 24, first, the function approximation unit 221d sets two opposing periphery portions on both sides with the principle axis of the low-luminance area interposed therebetween in Step i1. These can be set by dividing pixels that remain in accordance with a difference between the result of performing a known expansion process N1 times (here, N1 is a predetermined value) and the result of performing the expansion process N2 times (here, N2 is a predetermined value that is less than N1) by using a primary axis (reference: "Digital Image Processing", CG-ARTS Society, 183P, *Primary axis*) as shape feature data of the area into two parts.

Then, the function approximation unit 221d calculates a function formula of an approximation curve based on pixel values within the opposition periphery portion for each of two set opposition periphery portions in Step i3. In this example, as the function formula of the approximation curve, a quadratic function that is represented in the following Equation (3) is used. Here, x and y are coordinates of a pixel within the opposing periphery portion, and z is a pixel value. In addition, the coefficients a to f of the function formula of Equation (3) can be acquired by using a least-square method.

$$z = ax^2 + by^2 + cxy + dx + ey + f \quad (3)$$

Thereafter, the difference calculating unit 222d calculates a difference between values of the function formulas of the approximation curves calculated for the opposing periphery portions in Step i5. For example, first, for each of the function formulas of two approximation curves calculated for the opposing periphery portions, a pixel value within the low-luminance area is calculated. Subsequently, an absolute value of the difference between pixel values at the same coordinates within the low-luminance area, which is calculated for each of the two function formulas, is calculated, and the absolute value is normalized with respect to the number of pixels of each opposing periphery portion. Thereafter, the absolute value of the difference that has been normalized as above is set as the value of the periphery continuity. When the value of the periphery continuity is small, it can be determined that there is continuity in the change in the pixel value between the opposing periphery portions. On the other hand, when the value of the periphery continuity is large, it can be determined that there is no continuity. Thereafter, the process is returned to Step h11 illustrated in FIG. 23 and proceeds to Step h13.

Then, in Step h13, the dark portion area determining unit 24d determines whether or not the low-luminance area as a processing target is a dark portion area based on the value of the periphery continuity calculated in Step h11. Described in more detail, the dark portion area determining unit 24d determines the low-luminance area as a processing target as a dark portion area in a case where the value of the periphery continuity of the luminance area is a threshold value set in advance or more. When it is determined whether or not the low-luminance area is a dark portion area as above, the process of loop D for the low-luminance area as a processing target ends. Then, the above-described process of loop D is performed for all the low-luminance areas.

As described above, according to the second embodiment, first, low-luminance areas are detected based on the pixel values of pixels of the intraluminal image. Then, the peripheral feature data is calculated for each detected low-luminance area based on pixel values of the periphery. Described in more detail, the periphery continuity that represents the continuity of change in the pixel value between the opposing periphery portions of the low-luminance area is calculated as the peripheral feature data based on the aspect of the dark portion area that the change in the pixel value is not continuous on the periphery of the dark portion area. Then, it is determined whether or not each dark portion candidate area is a dark portion area based on the peripheral feature data so as to extract the dark portion area. According to this second embodiment, the advantages similar to those of the first embodiment can be acquired, and therefore the dark portion area can be extracted with high accuracy by appropriately determining the dark portion area.

Third Embodiment

Figure 25:
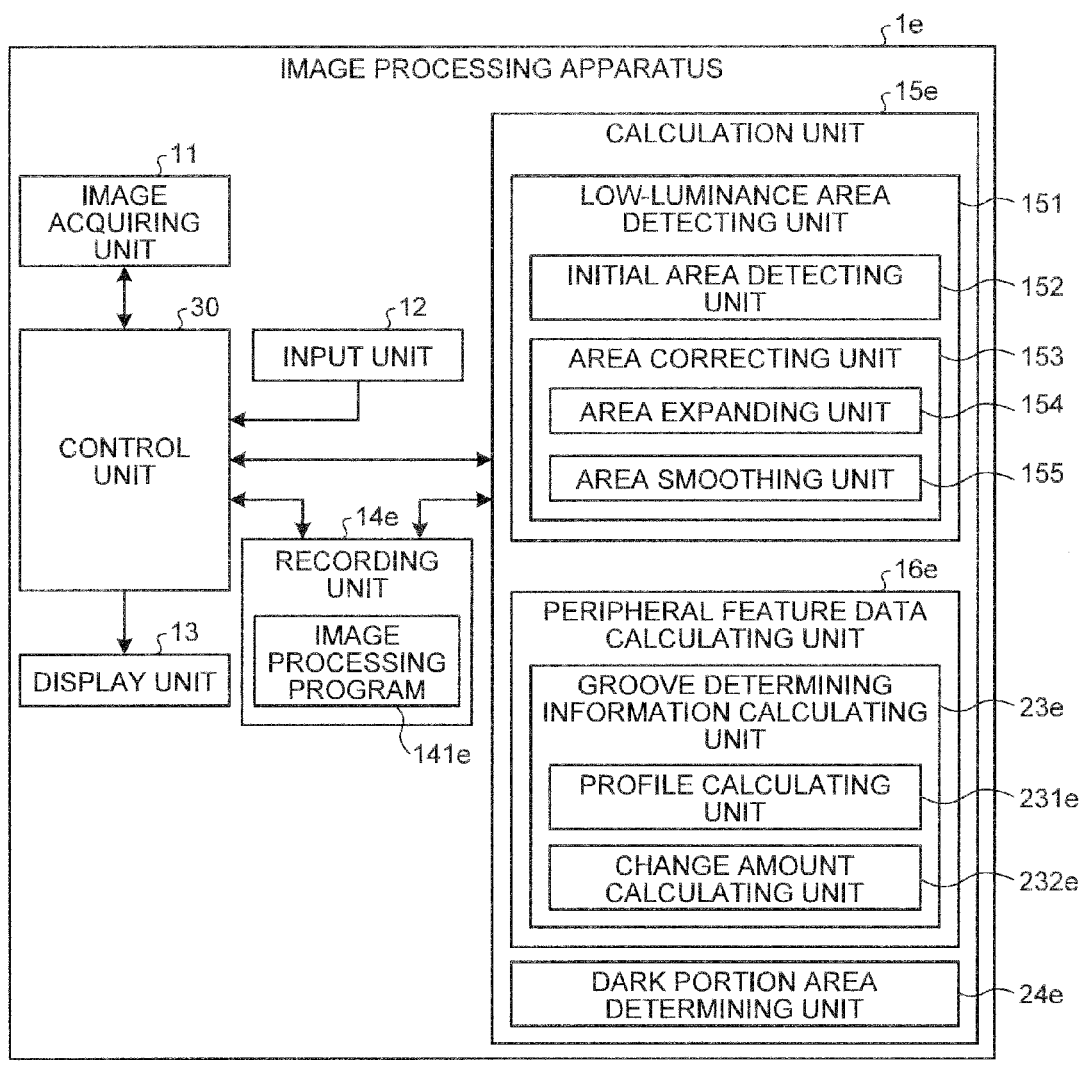
FIG. 25 is a block diagram illustrating a functional configuration of an image processing apparatus according to a third embodiment.

First, the configuration of an image processing apparatus according to a third embodiment will be described. FIG. 25 is a block diagram illustrating the functional configuration of an image processing apparatus 1e according to the third embodiment. Here, the same reference numeral is assigned to the same configuration as that described in the first embodiment. The image processing apparatus 1e according to the third embodiment, as illustrated in FIG. 25, includes an image acquiring unit 11, an input unit 12, a display unit 13, a recording unit 14e, a calculation unit 15e, and a control unit 30 that controls the overall operation of the image processing apparatus 1e.

In the recording unit 14e, an image processing program 141e used for detecting a dark portion area from an intraluminal image based on groove determining information as an example of the peripheral feature data is recorded. Here, the groove determining information represents information that is used for determining whether or not a groove is present on the periphery of a low-luminance area.

The calculation unit 15e includes a low-luminance area detecting unit 151, a peripheral feature data calculating unit 16e, and a dark portion area determining unit 24e. In the third embodiment, the peripheral feature data calculating unit 16e is a functional unit that calculates the peripheral feature data of a low-luminance area based on pixel values of the periphery of the low-luminance area and includes a groove determining information calculating unit 23e as a unit used for calculating the groove determining information. This groove determining information calculating unit 23e includes a profile calculating unit 231e as a unit used for calculating a profile and a change amount calculating unit 232e as a unit used for calculating the amount of change. The profile calculating unit 231e acquires pixel values on an extension contour line that is set parallel with the contour of the low-luminance area on the periphery of the low-luminance area and calculates a periphery profile that represents a change in the pixel value along the extension contour line. The change amount calculating unit 232e calculates the amount of change in the pixel value between adjacent extension contour pixels based on the periphery profile.

In an intraluminal image acquired by imaging the inside of the small intestine, an image can be easily acquired in which wrinkles on the surface of the mucous membrane are reflected on the periphery of the dark-portion area as grooves. Thus, according to the third embodiment, first, a low-luminance area as a candidate for a dark portion area is detected from the intraluminal image. Then, by focusing on whether or not there is a groove present on the periphery of the detected low-luminance area, it is determined whether or not the detected low-luminance area is a dark portion area, and the dark portion area is extracted.

Figure 26:
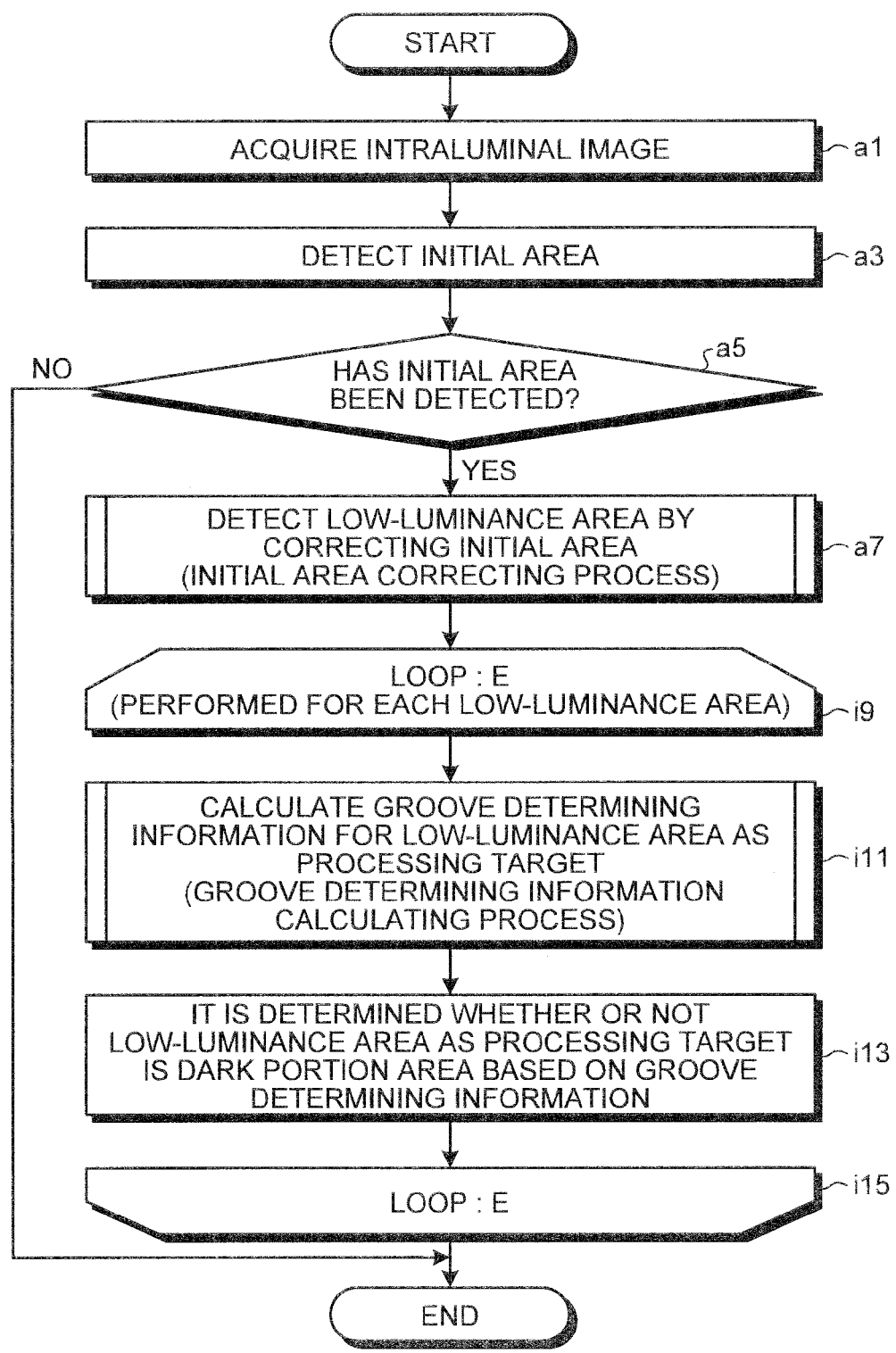
FIG. 26 is an overall flowchart illustrating a processing sequence performed by an image processing apparatus according to the third embodiment.

Next, a detailed processing sequence performed by the image processing apparatus 1e according to the third embodiment will be described. FIG. 26 is an entire flowchart illustrating the processing sequence performed by the image processing apparatus 1e according to the third embodiment. The process described here is realized by executing the image processing program 141e that is recorded in the recording unit 14e by using the calculation unit 15e. In FIG. 26, the same reference numeral is assigned to the same processing sequence as that of the first embodiment.

As illustrated in FIG. 26, according to the third embodiment, after the area correcting unit 153 detects low-luminance areas by performing an initial area correcting process in Step a7, the process of loop E is performed for each low-luminance area in Steps i9 to i15. In this loop E, first, the groove determining information calculating unit 23e calculates groove determining information for the low-luminance area as a processing target by performing a groove determining information calculating process in Step i11.

Figure 27:
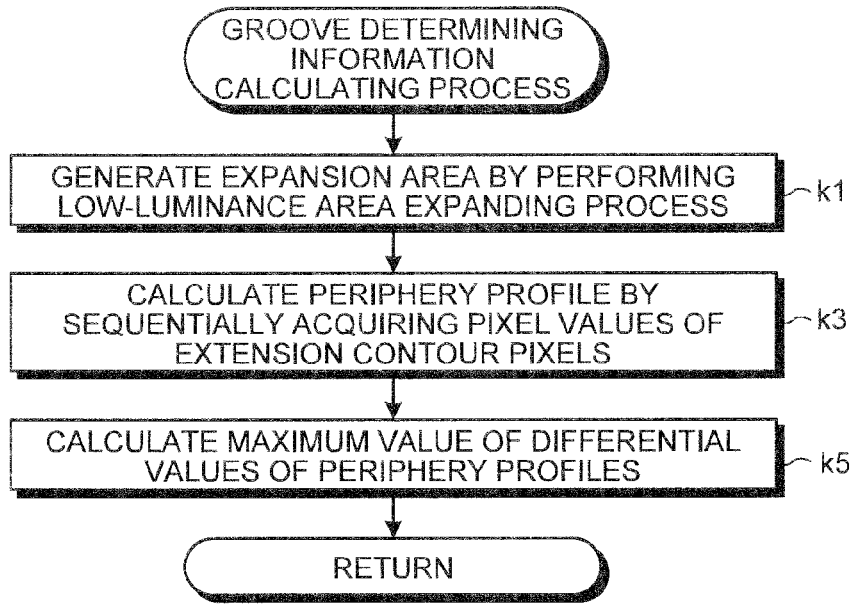
FIG. 27 is a flowchart illustrating a detailed processing sequence of a groove determining information calculating process according to the third embodiment.

FIG. 27 is a flowchart illustrating a detailed processing sequence of the groove determining information calculating process according to the third embodiment. In the groove determining information calculating process, as illustrated in FIG. 27, first, the groove determining information calculating unit 23e expands a low-luminance area so as to generate an expansion area on the outer periphery by performing a low-luminance area expanding process in Step k1. Subsequently, the profile calculating unit 231e sequentially acquires pixel values of contour pixels (extension contour pixels) located in the generated expanded area and calculates a periphery profile in Step k3. Thereafter, the change amount calculating unit 232e acquires a differential value of each extension contour pixel based on the periphery profile and calculates a maximum value thereof so as to be set as the groove determining information in Step k5. In a case where the maximum value of the differential values of the periphery profile is large, it can be determined that a groove is present on the periphery of the low-luminance area. On the other hand, in a case where the maximum value is small, it can be determined that any groove is not present. Thereafter, the process is returned to Step i11 illustrated in FIG. 26 and proceeds to Step i13.

Then, in Step i13, the dark portion area determining unit 24e determines whether or not the low-luminance area as a processing target is a dark portion area based on the groove determining information calculated in Step i11. Described in more detail, the dark portion area determining unit 24e determines the low-luminance area, which is a processing target, as a dark portion area in a case where the value of the groove determining information is a threshold value set in advance or more. When it is determined whether or not the low-luminance area is a dark portion area as above, the process of loop E for the low-luminance area as a processing target ends. Then, the above-described process of loop E is performed for all the low-luminance areas.

As described above, according to the third embodiment, first, low-luminance areas are detected based on the pixel values of pixels of the intraluminal image. Then, the groove determining information as an example of the peripheral feature data is calculated for each detected low-luminance area based on pixel values of the periphery. In the third embodiment, a case is assumed in which an intraluminal image in which a groove is present on the periphery of the dark portion area, and by sequentially acquiring pixel values of the extension contour pixels located in the low-luminance area, a maximum value of differential values of the calculated periphery profile is calculated as the grove determining information. Then, it is determined whether or not each dark portion candidate area is a dark portion area based on the groove determining information, which is the peripheral feature data, so as to extract the dark portion area. According to this third embodiment, the advantages similar to those of the first embodiment can be acquired, and therefore the dark portion area can be extracted with high accuracy by appropriately determining the dark portion area.

Here, the groove determining information is not limited to the maximum value of the differential values of the periphery profile described in the third embodiment, and, for example, the groove determining information may be calculated as in the fourth or fifth modification.

Fourth Modification

Figure 28:
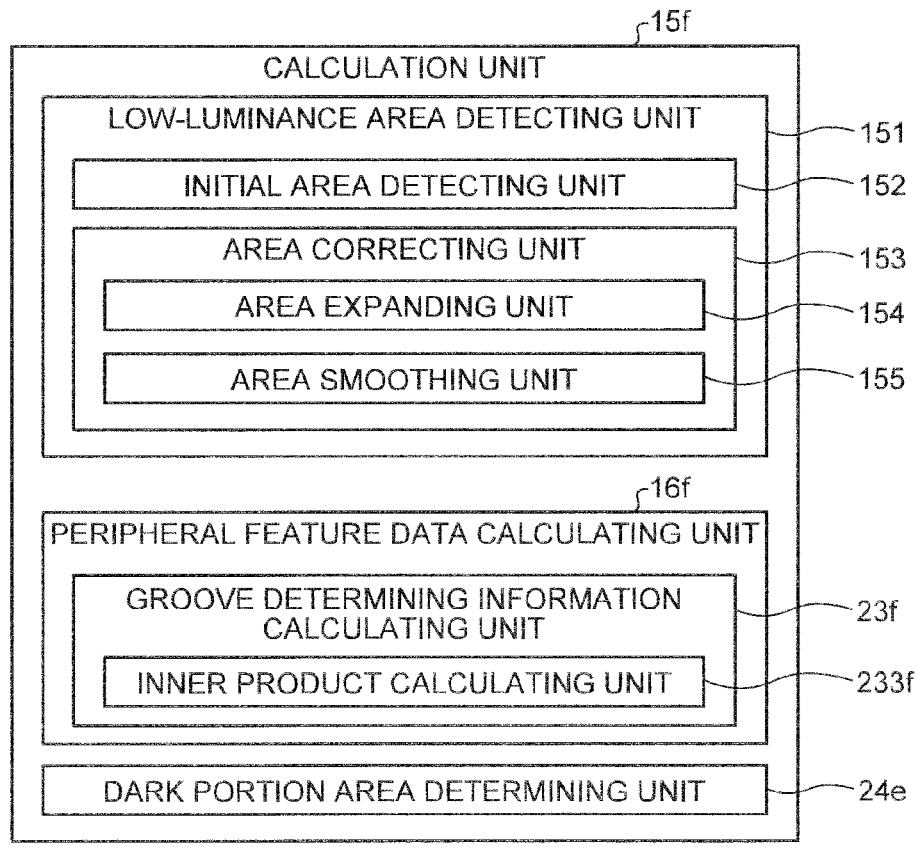
FIG. 28 is a diagram illustrating a configuration of a calculation unit of an image processing apparatus according to a fourth modification.

FIG. 28 is a diagram illustrating the configuration of a calculation unit 15f of an image processing apparatus according to a fourth modification. The image processing apparatus according to the fourth modification can be realized by replacing the calculation unit 15e of the image processing apparatus 1e according to the third embodiment illustrated in FIG. 25 with a calculation unit 15f illustrated in FIG. 28. In FIG. 28, the same reference numeral is assigned to the same configuration as that of the third embodiment. As illustrated in FIG. 28, according to the fourth modification, a groove determining information calculating unit 23f included in a peripheral feature data calculating unit 16f of the calculation unit 15f is different from that of the third embodiment. The groove determining information calculating unit 23f includes an inner product calculating unit 233f as a unit used for calculating an inner product. The inner product calculating unit 233f, for each contour pixel of the low-luminance area, sets the contour pixel as a base point and calculates an inner product of proximity contour pixel direction vectors positioned toward other contour pixels that are present on both sides with the contour pixel located at the base point interposed therebetween.

Figure 29:
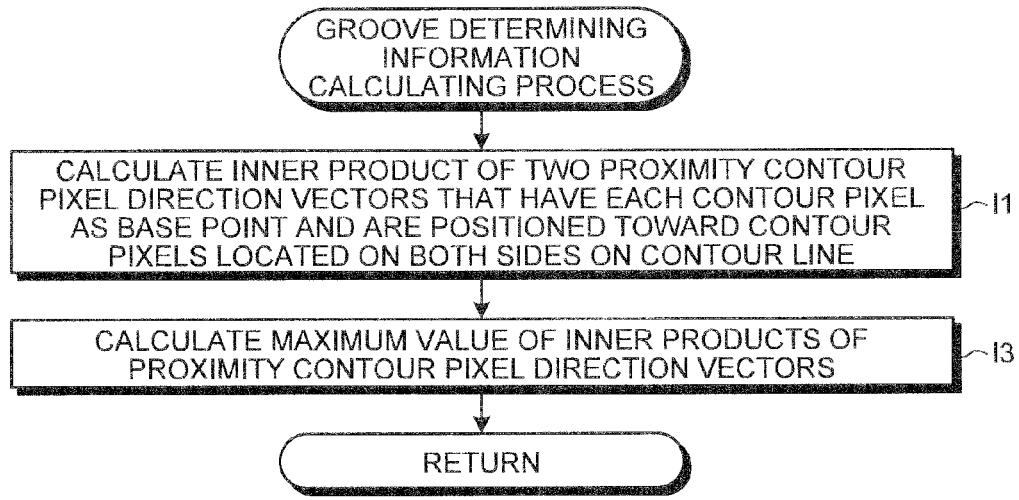
FIG. 29 is a flowchart illustrating a detailed processing sequence of a groove determining information calculating process according to the fourth modification.

FIG. 29 is a flowchart illustrating a detailed processing sequence of a groove determining information calculating process according to the fourth modification. In the fourth modification, the groove determining information calculating process, which is illustrated in FIG. 27, described as the process of Step i11 illustrated in FIG. 26 in the third embodiment is replaced, and the groove determining information calculating process illustrated in FIG. 29 is performed. In this groove determining information calculating process, as illustrated in FIG. 29, first, the inner product calculating unit 233f calculates an inner product of the proximity contour pixel direction vectors for each contour pixel located in the low-luminance area in Step 11. The process performed here may be realized by the same process as Step f1 illustrated in FIG. 16.

Thereafter, the groove determining information calculating unit 23f calculates a maximum value of the inner products of the proximity contour pixel direction vectors that are calculated for the contour pixels in Step 11 and sets the maximum value as the groove determining information in Step 13. As described in the second modification of the first embodiment, in a case where there is a contour pixel for which the value of the inner product of the proximity contour pixel direction vectors is large, it can be determined that a groove is present on the outer side thereof. On the other hand, in a case where the value of the inner product is small, it can be determined that any groove is not present. In addition, for the determining of the dark portion area in this case, similarly to that according to the third embodiment, the dark portion area determining unit 24e determines the low-luminance area, which is a processing target, as a dark portion area in a case where the value of the groove determining information is a threshold value set in advance or more.

According to this fourth modification, advantages similar to those of the third embodiment can be acquired, and therefore a dark portion area can be extracted with high accuracy by appropriately determining the dark portion area.

Fifth Modification

Figure 30:
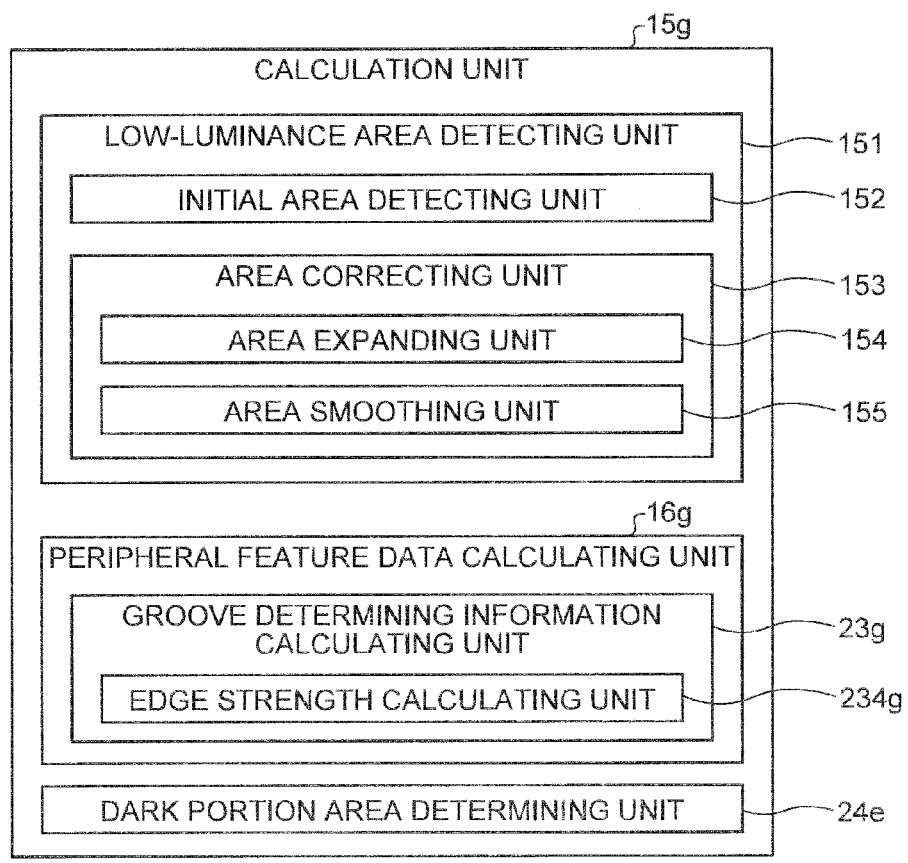
FIG. 30 is a diagram illustrating the configuration of a calculation unit of an image processing apparatus according to a fifth modification.

FIG. 30 is a diagram illustrating the configuration of a calculation unit 15g of an image processing apparatus according to a fifth modification. The image processing apparatus according to the fifth modification can be realized by replacing the calculation unit 15e of the image processing apparatus 1e according to the third embodiment illustrated in FIG. 25 with a calculation unit 15g illustrated in FIG. 30. In FIG. 30, the same reference numeral is assigned to the same configuration as that of the third embodiment. As illustrated in FIG. 30, according to the fifth modification, a groove determining information calculating unit 23g included in a peripheral feature data calculating unit 16g of the calculation unit 15g is different from that of the third embodiment. The groove determining information calculating unit 23g includes an edge strength calculating unit 234g as a unit used for calculating the edge strength. The edge strength calculating unit 234g calculates edge strength on the periphery of the low-luminance area.

Figure 31:
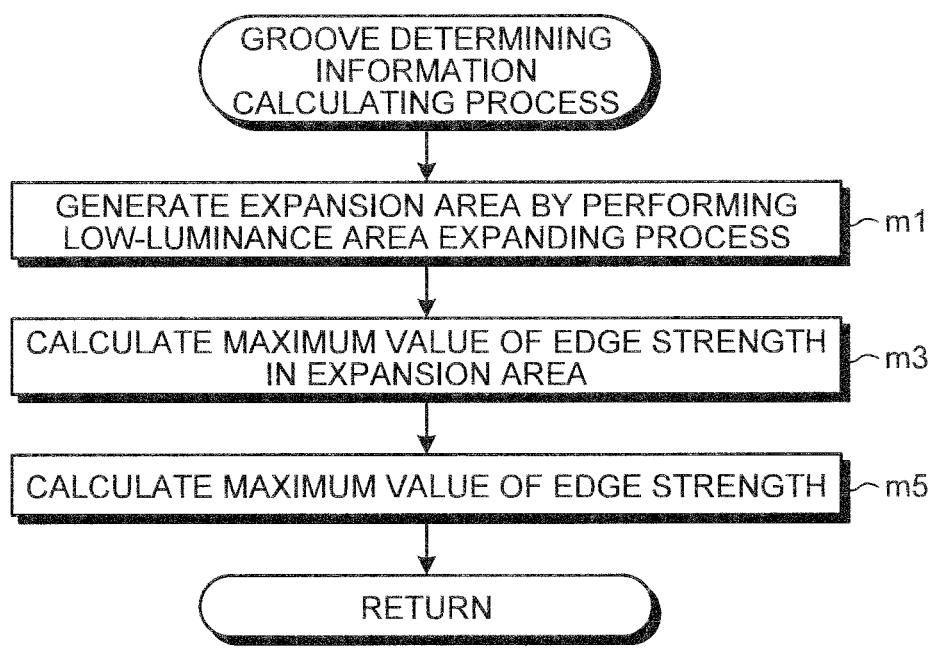
FIG. 31 is a flowchart illustrating a detailed processing sequence of a groove determining information calculating process according to the fifth modification.

FIG. 31 is a flowchart illustrating a detailed processing sequence of a groove determining information calculating process according to the fifth modification. In the fifth modification, the groove determining information calculating process, which is illustrated in FIG. 27, described as the process of Step i11 illustrated in FIG. 26 in the third embodiment is replaced, and the groove determining information calculating process illustrated in FIG. 31 is performed. In this groove determining information calculating process, as illustrated in FIG. 31, first, the edge strength calculating unit 234g expands the low-luminance area so as to generate an expansion area on the outer periphery by performing a low-luminance area expanding process in Step m1. The process performed here can be realized by the same process as that of Step d1 illustrated in FIG. 8. Then, the edge strength calculating unit 234g calculates edge strength for each pixel located in the generated expansion area of the low-luminance area in Step m3.

Thereafter, the groove determining information calculating unit 23g calculates a maximum value of the edge strength calculated for each pixel located in the expansion area in Step m3 and sets the maximum value as the groove determining information in Step m5. As described in the third modification of the first embodiment, in a case where there is a pixel having a large value of the edge strength within the expansion area, there is a high possibility that position of the pixel is a groove position. On the other hand, in a case where the value is small, the possibility of being a groove position is low. In addition, for the determining of the dark portion area in this case, similarly to that according to the third embodiment, the dark portion area determining unit 24e determines the low-luminance area, which is a processing target, as a dark portion area in a case where the value of the groove determining information is a threshold value set in advance or more.

According to this fifth modification, advantages similar to those of the third embodiment can be acquired, and therefore a dark portion area can be extracted with high accuracy by appropriately determining the dark portion area.

Furthermore, the image processing apparatus 1 according to the first embodiment, the image processing apparatus 1d according to the second embodiment, and the image processing apparatus 1e according to the third embodiment described above can be realized by executing a program prepared in advance by using a computer system such as a personal computer or a workstation. Hereinafter, a computer system that has the same functions as those of the image processing apparatuses 1, 1d, and 1e described in the first to third embodiments and executes the image processing programs 141, 141d, and 141e will be described.

Figure 32:
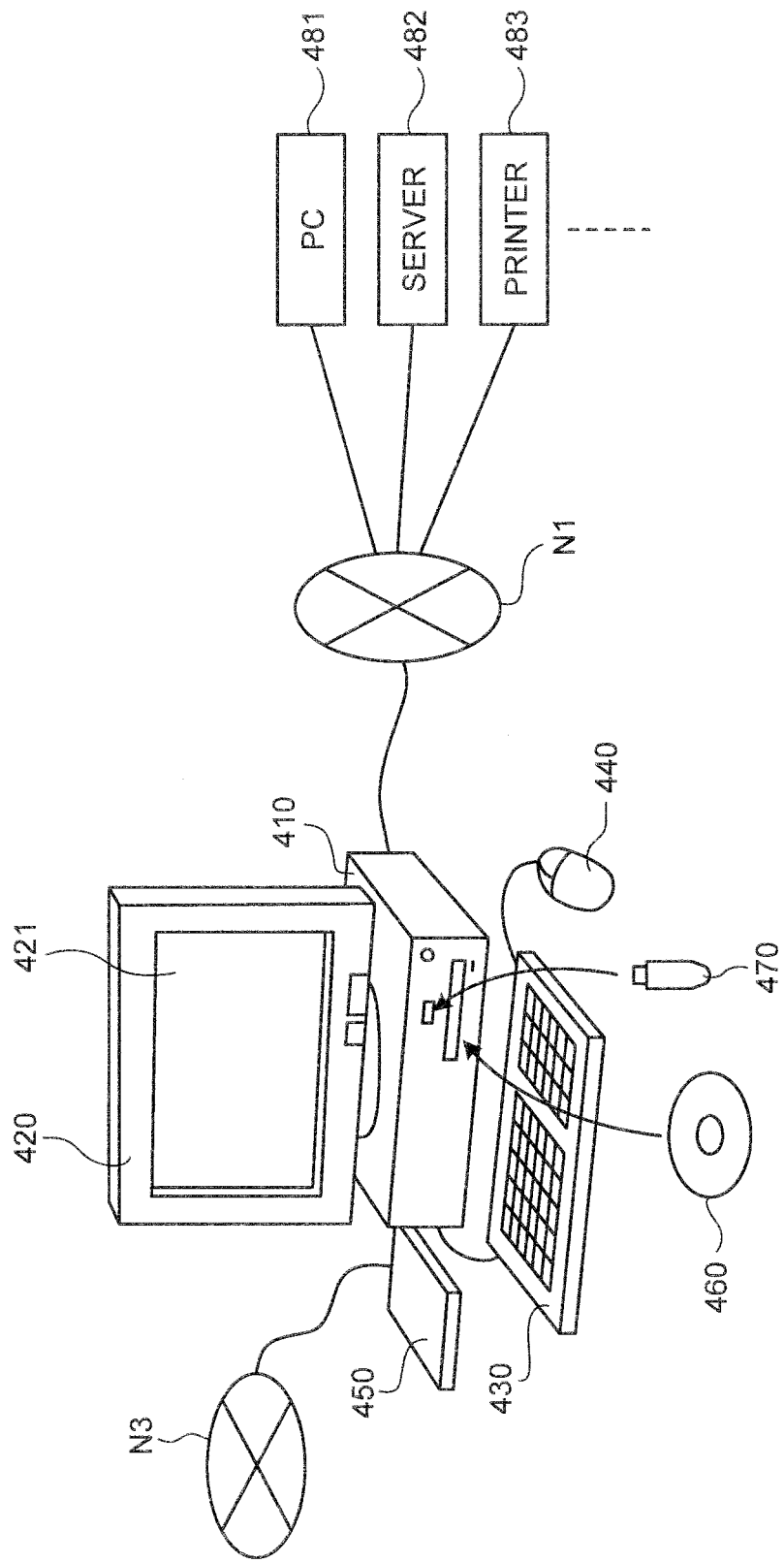
FIG. 32 is a system configuration diagram illustrating a configuration of a computer system to which the present invention is applied.
Figure 33:
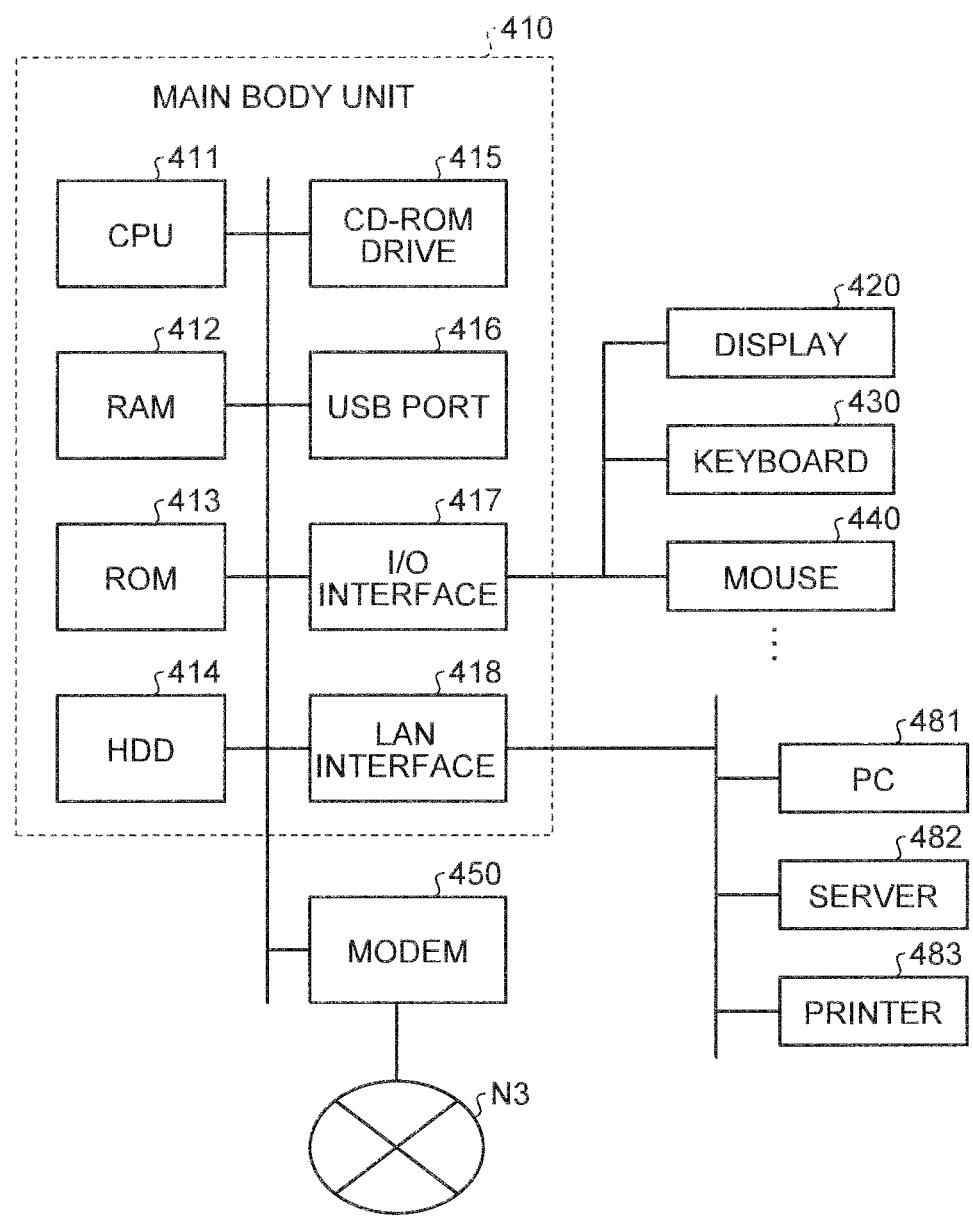
FIG. 33 is a block diagram illustrating a configuration of a main body unit of the computer system illustrated in FIG. 32.

FIG. 32 is a system configuration diagram illustrating the configuration of a computer system 400 according to this modification, and FIG. 33 is a block diagram illustrating the configuration of a main body unit 410 of the computer system 400. As illustrated in FIG. 32, the computer system 400 includes: a main body unit 410; a display 420 that is used for displaying information such as an image on a display screen 421 in accordance with an instruction transmitted from the main body unit 410; a keyboard 430 that is used for inputting various types of information to the computer system 400; and a mouse 440 that is used for designating an arbitrary position on the display screen 421 of the display 420.

In addition, the main body unit 410 of this computer system 400, as illustrated in FIGS. 32 and 33, includes: a CPU 411; a RAM 412; a ROM 413; a hard disk drive (HDD) 414; a CD-ROM drive 415 that accepts a CD-ROM 460; a USB port 416 to which a USB memory 470 can be detachably connected; an I/O interface 417 that connects the display 420, the keyboard 430, and the mouse 440 together; and a LAN interface 418 that is used for being connected to a local area network or a wide area network (LAN/WAN) N1

Furthermore, to this computer system 400, a modem 450 that is used for being connected to a public circuit N3 such as the Internet and a personal computer (PC) 481 as another computer system, a server 482, a printer 483, and the like are connected through the LAN interface 418 and the local network or the wide area network N1.

This computer system 400 realizes the image processing apparatus (for example, the image processing apparatus 1 according to the first embodiment, the image processing apparatus 1d according to the second embodiment, or the image processing apparatus 1e according to the third embodiment) by reading out and executing an image processing program (for example, the image processing program 141 according to the first embodiment, the image processing program 141d according to the second embodiment, or the image processing program 141e according to the third embodiment) stored on a recording medium. Here, the recording media includes all types of recording media on which an image processing program is recorded so as to be readable by using the computer system 400 such as "portable-type physical media" including an MO disc, a DVD disc, a flexible disc, (FD), an IC card, and the like in addition to a CD-ROM 460 and a USB memory 470, "fixed-type physical media" including an HDD 414, a RAM 412, a ROM 413, and the like that can be internally or externally included in the computer system 400, and "communication media" such as a public circuit N3 that is connected through the modem 450, a local area network or a wide area network N1 to which the PC 481 as another computer system or the server 482 is connected, and the like that store a program for a short time when the program is transmitted.

In other words, the image processing program is recorded on a recording medium such as a "portable-type physical medium," a "fixed-type physical medium," or a "communication medium" in a computer-readable form, and the image processing apparatus is realized by reading out the image processing program from such a recording medium and executing the image processing program by using the computer system 400. In addition, the image processing program is not limited as being executed by the computer system 400, and the present invention can be similarly applied to a case where the PC 481 as another computer system or the server 482 executes the image processing program or a case where the PC 481 and the server 482 cooperatively execute the image processing program.

In addition, the present invention is not limited to the first to third embodiments described above and the modifications thereof, and various inventions can be made by appropriately combining a plurality of constituent elements disclosed in the embodiments and the modifications. For example, a configuration may be employed in which several constituent elements are excluded from all the constituent elements illustrated in each embodiment or each modification. Alternatively, the constituent elements illustrated in other embodiments and other modifications may be appropriately combined.

According to an aspect of the present invention described above, there is an advantage that a dark portion area can be extracted with high accuracy by appropriately determining whether or not an area is a dark portion area.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of processing an image for extracting a dark portion area, which is an area inside of a lumen which receives little light, from an intraluminal image, the method comprising:
    detecting a low-luminance area based on pixel values of pixels of the intraluminal image;
    setting a periphery area that is expanded from the low-luminance area;
    calculating peripheral feature data based on the pixel values of the periphery area of the low-luminance area after the periphery area of the low-luminance area is set; and
    determining whether or not the low-luminance area is a dark portion area based on the peripheral feature data.

2. An image processing apparatus for extracting a dark portion area, which is an area inside of a lumen which receives little light, from an intraluminal image, the image processing apparatus comprising:
    a processor; and
    a memory storing computer-readable instructions that, when executed by the processor, implement:
    a low-luminance area detecting unit that detects a low-luminance area based on pixel values of pixels of the intraluminal image;
    a setting unit for setting a periphery area that is expanded from the low-luminance area;
    a peripheral feature data calculating unit that calculates peripheral feature data based on pixel values of the periphery area of the low-luminance area after the periphery area of the low-luminance area is set by the setting unit; and
    a dark portion area determining unit that determines whether or not the low-luminance area is a dark portion area based on the peripheral feature data.

3. The image processing apparatus according to claim 2, wherein the low-luminance area detecting unit includes:
    an initial area detecting unit that detects an initial area based on color feature data of the intraluminal image; and
    an area correcting unit that corrects the initial area based on the color feature data of a periphery of the initial area or a shape of the initial area.

4. The image processing apparatus according to claim 2, wherein the peripheral feature data calculating unit includes a concentration ratio calculating unit that calculates a concentration ratio of a plurality of gradients that is a value indicating a degree of a direction of the gradients on the periphery of the low-luminance area being directed to a side of the low-luminance area as the peripheral feature data.

5. The image processing apparatus according to claim 3, wherein the area correcting unit includes:
    an area expanding unit that expands the initial area by integrating an adjacent area having color feature data similar to the color feature data of the initial area with the initial area; and
    a contour smoothing unit that corrects a contour of an image after being expanded by the area expanding unit to be smooth.

6. The image processing apparatus according to claim 3, wherein the area correcting unit corrects the initial area by transforming the initial area by using an active contour model.

7. The image processing apparatus according to claim 4, wherein the concentration ratio calculating unit includes:
    an outside direction vector calculating unit that calculates an outside direction vector starting from the low-luminance area toward an outside direction;
    a gradient vector calculating unit that calculates a gradient vector of an area present in the outside of the low-luminance area; and
    an inner product calculating unit that calculates an inner product of the outside direction vector and the gradient vector.

8. The image processing apparatus according to claim 7, wherein the outside direction vector calculating unit includes a normal-line vector calculating unit that calculates a normal-line vector with respect to a contour of the low-luminance area, and
    wherein the normal-line vector is set to the outside direction vector.

9. The image processing apparatus according to claim 7, wherein the outside direction vector calculating unit includes:
    a gravitational center calculating unit that calculates a gravitational center of the low luminance area; and
    a radiation vector calculating unit that calculates a radiation direction vector that is positioned from the gravitational center toward a radiation direction,
    wherein the radiation direction vector is set as the outside direction vector.

10. The image processing apparatus according to claim 7, wherein the gradient vector calculating unit includes a calculation range limiting unit, as the setting unit for setting a periphery area of the low-luminance area, that limits a range in which the gradient vector is calculated based on whether or not there is a steep gradient on the periphery of the low-luminance area.

11. The image processing apparatus according to claim 10, wherein the calculation range limiting unit includes:
    a profile calculating unit that acquires pixel values on an extension contour line that is set to be parallel to a contour of the low-luminance area on the periphery of the low-luminance area and calculates a periphery profile that indicates a change in the pixel value along the extension contour line; and a minimum portion detecting unit that detects a minimum portion of the change in the pixel value.

12. The image processing apparatus according to claim 10, wherein the calculation range limiting unit includes:
an inner product calculating unit that uses a contour pixel of the low-luminance area as a base point and calculates an inner product of vectors positioned toward other contour pixels that are present on both sides of the contour pixel located at the base point; and
an inner product determining unit that determines whether or not there is a steep gradient on the periphery of the low-luminance area based on a magnitude of the inner product.

13. The image processing apparatus according to claim 10, wherein the calculation range limiting unit includes:
an edge strength calculating unit that calculates edge strength on the periphery of the low-luminance area; and
an edge-strength determining unit that determines whether or not there is a steep gradient on the periphery of the low-luminance area based on a magnitude of the edge strength.

14. The image processing apparatus according to claim 7, wherein the gradient vector calculating unit includes a periphery smoothing unit that performs smoothing for the periphery of the low-luminance area based on frequency feature data on the periphery of the low-luminance area.

15. The image processing apparatus according to claim 14, wherein the periphery smoothing unit includes:
a frequency feature data calculating unit that calculates the frequency feature data based on a dominant frequency component on the periphery of the low-luminance area; and
a high-frequency component removing unit that removes a high-frequency component from the periphery of the low-luminance area based on the frequency feature data.

16. The image processing apparatus according to claim 15, wherein the high-frequency component removing unit performs a morphological process for the periphery of the low-luminance area by using a structure element of a size corresponding to the frequency feature data.

17. The image processing apparatus according to claim 15, wherein the high-frequency component removing unit performs a low-pass filtering process for the periphery of the low-luminance area based on the frequency feature data.

18. The image processing apparatus according to claim 2, wherein the peripheral feature data calculating unit includes a continuity calculating unit that calculates continuity of the change in the pixel value between opposing periphery portions that oppose each other with the low-luminance area interposed therebetween on the periphery of the low-luminance area as the peripheral feature data.

19. The image processing apparatus according to claim 18, wherein the continuity calculating unit includes:
a function approximation unit that approximates pixel values within each of the opposing periphery portions as a function formula of a face for each of the opposing periphery portions; and
a difference calculating unit that calculates a difference in values of the functional formulas at the same coordinates within the low-luminance area by using the function formulas.

20. The image processing apparatus according to claim 2, wherein the peripheral feature data calculating unit includes a groove determining information calculating unit that calculates groove determining information that is information used for determining whether or not there is a steep gradient on the periphery of the low-luminance area.

21. The image processing apparatus according to claim 20, wherein the groove determining information calculating unit includes:
a profile calculating unit that acquires pixel values on the extension contour line that is set to be parallel to the contour of the low-luminance area on the periphery of the low-luminance area and calculates a periphery profile that indicates a change in the pixel value along the extension contour line; and
a change amount calculating unit that calculates an amount of change in the pixel value between adjacent extension contour pixels based on the change in the pixel value,
wherein the amount of change is used as the groove determining information.

22. The image processing apparatus according to claim 20, wherein
the groove determining information calculating unit includes an inner product calculating unit that uses a contour pixel of the low-luminance area as a base point and calculates an inner product of vectors positioned toward other contour pixels that are present on both sides of the contour pixel located at the base point, and
a magnitude of the inner product is set as the groove determining information.

23. The image processing apparatus according to claim 20, wherein
the groove determining information calculating unit includes an edge strength calculating unit that calculates edge strength on the periphery of the low-luminance area, and
the edge strength is set as the groove determining information.

24. An image processing apparatus for extracting a dark portion area, which is an area inside of a lumen which receives little light, from an intraluminal image, the image processing apparatus comprising:
a low-luminance area detecting unit that detects a low-luminance area based on pixel values of pixels of the intraluminal image;
a setting unit for setting a periphery area that is expanded from the low-luminance area;
a peripheral feature data calculating unit that calculates peripheral feature data based on pixel values of the periphery area of the low-luminance area after the periphery area of the low-luminance area is set by the setting unit; and
a dark portion area determining unit that determines whether or not the low-luminance area is a dark portion area based on the peripheral feature data.

25. A non-transitory computer-readable recording medium with an executable program stored thereon for extracting a dark portion area, which is an area inside of a lumen which receives little light, from an intraluminal image, wherein the program instructs a processor to perform:
detecting a low-luminance area based on pixel values of pixels of the intraluminal image;
setting a periphery area that is expanded from the low-luminance area;
calculating peripheral feature data based on the pixel values of the periphery area of the low-luminance area after the periphery area of the low-luminance area is set; and determining whether or not the low-luminance area is a dark portion area based on the peripheral feature data.

* * * * *